US010951768B2

(12) United States Patent
Pace

(10) Patent No.: US 10,951,768 B2
(45) Date of Patent: Mar. 16, 2021

(54) MEASURING COGNITIVE CAPABILITIES OF AUTOMATED RESOURCES AND RELATED MANAGEMENT THEREOF IN CONTACT CENTERS

(71) Applicant: Genesys Telecommunications Laboratories, Inc., Daly City, CA (US)

(72) Inventor: Pierluigi Pace, Rome (IT)

( * ) Notice: Subject to any disclaimer, the term of this patent is extended or adjusted under 35 U.S.C. 154(b) by 0 days.

(21) Appl. No.: 16/866,496

(22) Filed: May 4, 2020

(65) Prior Publication Data

US 2020/0351405 A1   Nov. 5, 2020

Related U.S. Application Data

(60) Provisional application No. 62/842,550, filed on May 3, 2019.

(51) Int. Cl.
| | | |
|---|---|---|
| H04M 3/00 | (2006.01) | |
| H04M 3/523 | (2006.01) | |
| G06F 11/34 | (2006.01) | |
| H04M 3/51 | (2006.01) | |

(52) U.S. Cl.
CPC ....... *H04M 3/5233* (2013.01); *G06F 11/3409* (2013.01); *H04M 3/5175* (2013.01); *H04M 3/5191* (2013.01)

(58) Field of Classification Search
CPC ............. H04M 3/5233; H04M 3/5232; H04M 3/5235; H04M 3/5175; H04M 3/5191
See application file for complete search history.

(56) References Cited

U.S. PATENT DOCUMENTS

| | | | |
|---|---|---|---|
| 7,039,654 B1 | 5/2006 | Eder | |
| 2017/0269972 A1* | 9/2017 | Hosabettu | ............. G06F 9/4843 |
| 2018/0349206 A1* | 12/2018 | Erickson | ............... G06F 40/263 |
| 2019/0266287 A1* | 8/2019 | Chen | .................. G06F 16/3329 |

* cited by examiner

*Primary Examiner* — Rasha S Al Aubaidi

(57) ABSTRACT

A method for managing automated resources that includes: calculating a channel RIQ score for a first bot in relation to a first communication channel and using it to modify a deployment of the first bot. The calculating the channel RIQ score for the first bot may include: identifying a first engagement scenario that the first bot is able to perform via the first communication channel; identifying target bot capabilities for performing the tasks of the first engagement scenario via the first communication channel; collecting performance data related to the first bot performing the first engagement scenario via the first communication channel; calculating the channel RIQ score by comparing: the performance data related to the first bot performing the first engagement scenario; and the target bot capabilities for performing the first engagement scenario via the first communication channel.

20 Claims, 7 Drawing Sheets

MEASURING COGNITIVE CAPABILITIES OF AUTOMATED RESOURCES AND RELATED MANAGEMENT THEREOF IN CONTACT CENTERS

CROSS REFERENCE TO RELATED APPLICATION

This application claims the benefit of U.S. Provisional Patent Application No. 62/842,550, titled "A METHOD FOR MEASURING THE INTELLIGENCE QUOTIENT OF VIRTUAL ASSISTANTS/BOTS IN MULTICHANNEL ENVIRONMENTS", filed in the U.S. Patent and Trademark Office on May 3, 2019, the contents of which are incorporated herein.

BACKGROUND

The present invention generally relates to telecommunications systems in the field of customer relations management including customer assistance via internet-based service options. More particularly, but not by way of limitation, the present invention pertains to systems and methods for automating the customer experience, including calibrating such services via measuring the capabilities and intelligence of virtual assistants and bots used to provide them.

BRIEF DESCRIPTION OF THE INVENTION

The present invention includes a method for managing automated resources within a contact center. The automated resources may include a plurality of bots configured to perform a plurality of engagement scenarios via a plurality of communication channels. The method may include: calculating a channel robotic intelligence quotient (hereinafter "channel RIQ") score for a first bot of the plurality of bots in relation to a first communication channel of the plurality of communication channels; and using the channel RIQ score of the first bot to modify a manner in which the first bot is deployed by the contact center to handle interactions with customers. The step of calculating the channel RIQ score for the first bot may include a first process that includes the steps of: identifying a first engagement scenario of the plurality of engagement scenarios that the first bot is able to perform via the first communication channel, the first engagement scenario defining a functional role and tasks related thereto for satisfying one or more predetermined objectives; identifying target bot capabilities for performing the tasks of the first engagement scenario via the first communication channel; collecting performance data related to the first bot performing the tasks of the first engagement scenario via the first communication channel; calculating the channel RIQ score for the first bot by comparing: the performance data related to the first bot performing the tasks of the first engagement scenario via the first communication channel; and the target bot capabilities for performing the tasks of the first engagement scenario via the first communication channel.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
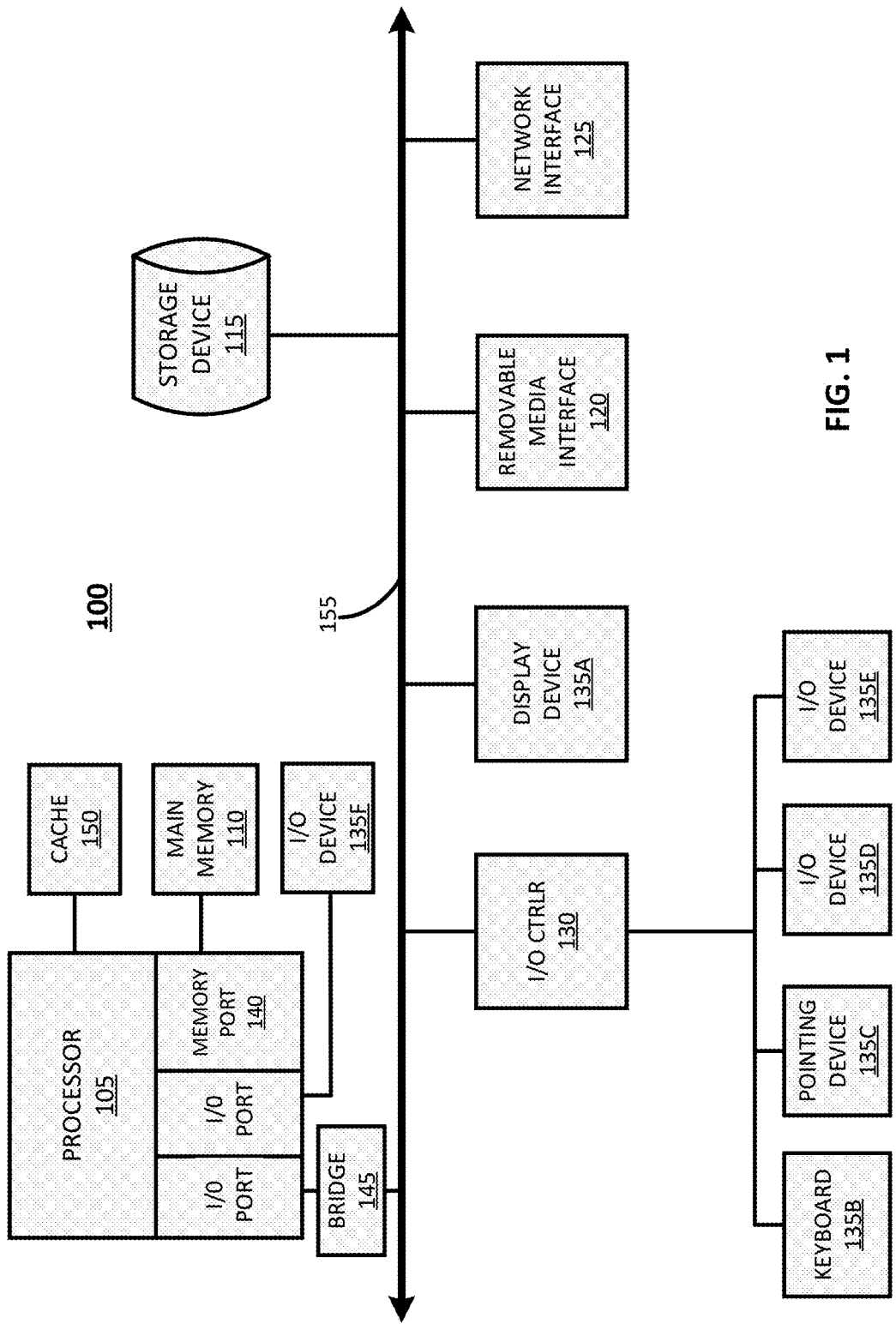
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art.

As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Thus, appearances of the phrases "an embodiment", "one embodiment", "present embodiments", "exemplary embodiments", "certain embodiments" and the like are not necessarily referring to the same embodiment or example. Further, particular features, structures or characteristics may be combined in any suitable combinations and/or sub-combinations in one or more embodiments or examples.

Those skilled in the art will recognize from the present disclosure that the various embodiments may be computer implemented using many different types of data processing equipment, with embodiments being implemented as an apparatus, method, or computer program product. Example embodiments, thus, may take the form of an entirely hardware embodiment, an entirely software embodiment, or an embodiment combining software and hardware aspects. Example embodiments further may take the form of a computer program product embodied by computer-usable program code in any tangible medium of expression. In each case, the example embodiment may be generally referred to as a "module", "system", or "method".

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

It will be appreciated that the systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures—such as, for example, the contact center system 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The cache memory 150 typically has a faster response time than main memory 110. The main memory 110 may be one or more memory chips capable of storing data and allowing stored data to be directly accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The I/O devices 135 and/or the I/O controller 130 may include suitable hardware and/or software for enabling the use of multiple display devices. The computing device 100 may also support one or more removable media interfaces 120, such as a disk drive, USB port, or any other device suitable for reading data from or writing data to computer readable media. More generally, the I/O devices 135 may include any conventional devices for performing the functionality described herein.

The computing device 100 may be any workstation, desktop computer, laptop or notebook computer, server machine, virtualized machine, mobile or smart phone, portable telecommunication device, media playing device, gaming system, mobile computing device, or any other type of computing, telecommunications or media device, without limitation, capable of performing the operations and functionality described herein. The computing device 100 include a plurality of devices connected by a network or connected to other systems and resources via a network. As used herein, a network includes one or more computing devices, machines, clients, client nodes, client machines, client computers, client devices, endpoints, or endpoint nodes in communication with one or more other computing devices, machines, clients, client nodes, client machines, client computers, client devices, endpoints, or endpoint nodes. For example, the network may be a private or public switched telephone network (PSTN), wireless carrier network, local area network (LAN), private wide area network (WAN), public WAN such as the Internet, etc., with connections being established using appropriate communication protocols. More generally, it should be understood that, unless otherwise limited, the computing device 100 may communicate with other computing devices 100 via any type of network using any conventional communication protocol. Further, the network may be a virtual network environment where various network components are virtualized. For example, the various machines may be virtual machines implemented as a software-based computer running on a physical machine, or a "hypervisor" type of virtualization may be used where multiple virtual machines run on the same host physical machine. Other types of virtualization are also contemplated.

Contact Center

Figure 2:
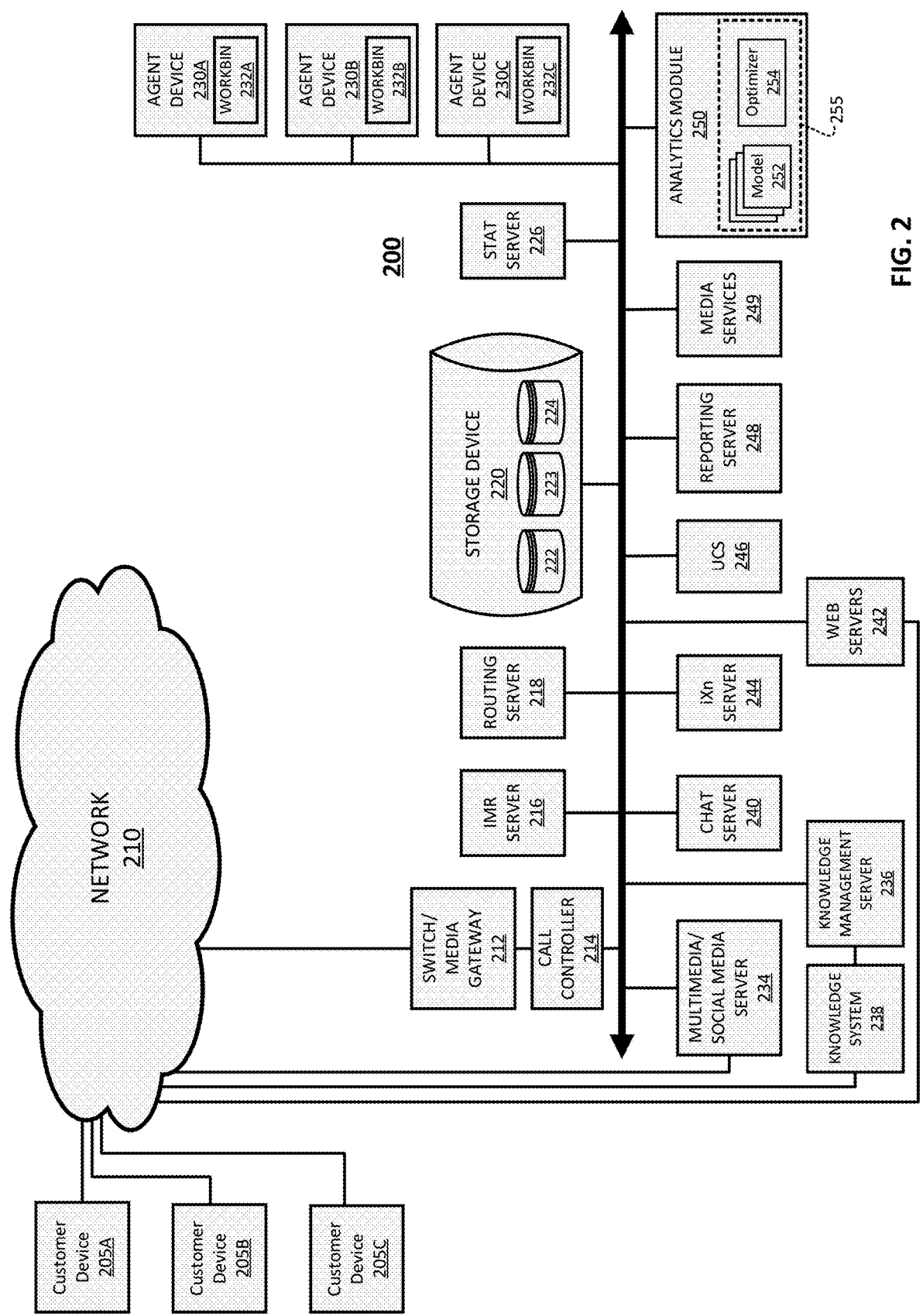
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), as well as the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize some level of automated processes in place of live agents, such as, for example, interactive voice response (IVR) systems, interactive media response (IMR) systems, internet robots or "bots", automated chat modules or "chatbots", and the like. In many cases this has proven to be a successful strategy, as automated processes can be highly efficient in handling certain types of interactions and effective at decreasing the need for live agents. Such automation allows contact centers to target the use of human agents for the more difficult customer interactions, while the automated processes handle the more repetitive or routine tasks. Further, automated processes can be structured in a way that optimizes efficiency and promotes repeatability. Whereas a human or live agent may forget to ask certain questions or follow-up on particular details, such mistakes are typically avoided through the use of automated processes. While customer service providers are increasingly relying on automated processes to interact with customers, the use of such technologies by customers remains far less developed. Thus, while IVR systems, IMR systems, and/or bots are used to automate portions of the interaction on the contact center-side of an interaction, the actions on the customer-side remain for the customer to perform manually.

Referring specifically to FIG. 2, the contact center system 200 may be used by a customer service provider to provide various types of services to customers. For example, the contact center system 200 may be used to engage and manage interactions in which automated processes (or bots) or human agents communicate with customers. As should be understood, the contact center system 200 may be an in-house facility to a business or enterprise for performing the functions of sales and customer service relative to products and services available through the enterprise. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment with infrastructure for supporting multiple contact centers for multiple enterprises. The contact center system 200 may include software applications or programs, which may be executed on premises or remotely or some combination thereof. It should further be appreciated that the various components of the contact center system 200 may be distributed across various geographic locations and not necessarily contained in a single location or computing environment.

It should further be understood that, unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; interaction (or "iXn") server 244; universal contact server (or "UCS") 246; reporting server 248; media services server 249; and analytics module 250. It should be understood that any of the computer-implemented components, modules, or servers described in relation to FIG. 2 or in any of the following figures may be implemented via types of computing devices, such as, for example, the computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, web-browsing sessions, and other multi-media transactions.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access (CDMA) network, global system for mobile communications (GSM) network, or any wireless network/technology conventional in the art, including but not limited to 3G, 4G, LTE, 5G, etc.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230.

As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the routing server 218, it may function to route incoming interactions. For example, once it is determined that an inbound communication should be handled by a human agent, functionality within the routing server 218 may select the most appropriate agent and route the communication thereto. This agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent is able to provide to the customer.

Regarding data storage, the contact center system 200 may include one or more mass storage devices—represented generally by the storage device 220—for storing data in one or more databases relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location. As an example, the databases may be Cassandra database, NoSQL database, or a SQL database and managed by a database management system, such as, Oracle, IBM DB2, Microsoft SQL server, or Microsoft Access, PostgreSQL.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center system 200 in ways that facilitate functionality described herein. An agent device 230, for example, may include a telephone adapted for regular telephone calls or VoIP calls. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices—i.e., agent devices 230A, 230B and 230C—it should be understood that any number may be present.

In regard to the multimedia/social media server 234, it may be configured to facilitate media interactions (other than voice) with the customer devices 205 and/or the servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art. As an example, the knowledge system 238 may be embodied as IBM Watson or a like system.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the interaction (iXn) server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction (iXn) server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

The various components, modules, and/or servers of FIG. 2 (as well as the other figures included herein) may each include one or more processors executing computer program instructions and interacting with other system components for performing the various functionalities described herein. Such computer program instructions may be stored in a memory implemented using a standard memory device, such as, for example, a random-access memory (RAM), or stored in other non-transitory computer readable media such as, for example, a CD-ROM, flash drive, etc. Although the functionality of each of the servers is described as being provided by the particular server, a person of skill in the art should recognize that the functionality of various servers may be combined or integrated into a single server, or the functionality of a particular server may be distributed across one or more other servers without departing from the scope of the present invention. Further, the terms "interaction" and "communication" are used interchangeably, and generally refer to any real-time and non-real-time interaction that uses any communication channel including, without limitation, telephone calls (PSTN or VoIP calls), emails, vmails, video, chat, screen-sharing, text messages, social media messages, WebRTC calls, etc. Access to and control of the components of the contact system 200 may be affected through user interfaces (UIs) which may be generated on the customer devices 205 and/or the agent devices 230. As already noted, the contact center system 200 may operate as a hybrid system in which some or all components are hosted remotely, such as in a cloud-based or cloud computing environment.

Chat Systems

Figure 3:
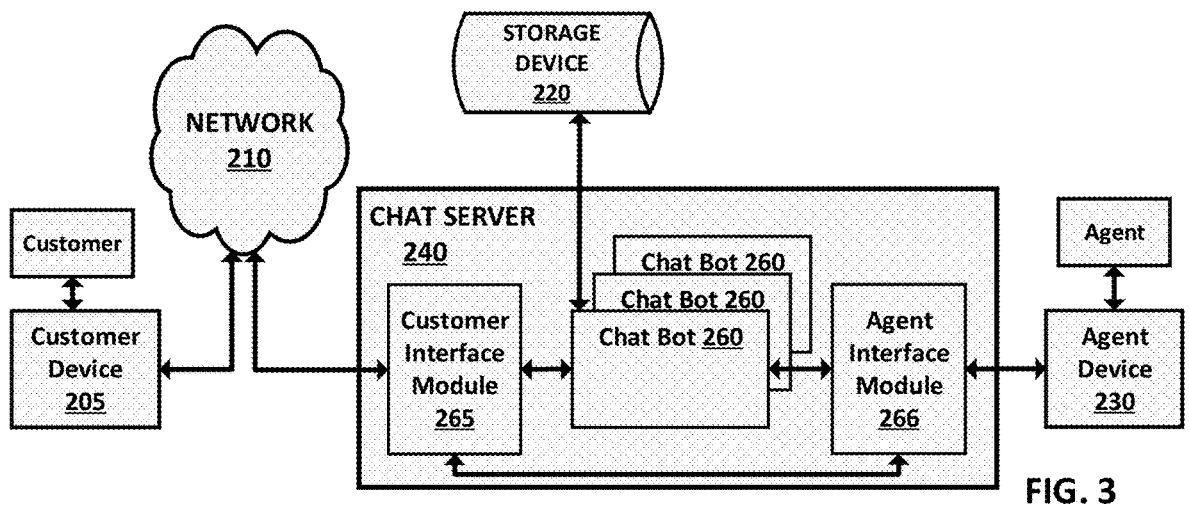
FIG. 3 is schematic block diagram showing further details of a chat server operating as part of the chat system according to embodiments of the present invention.
Figure 4:
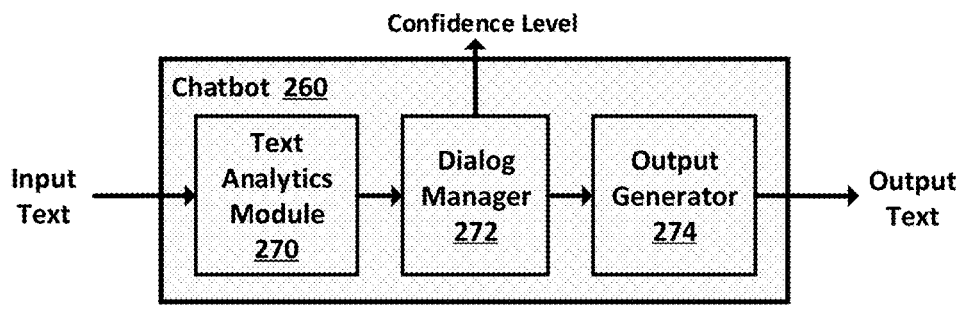
FIG. 4 is a schematic block diagram of a chat module according to embodiments of the present invention.
Figure 5:
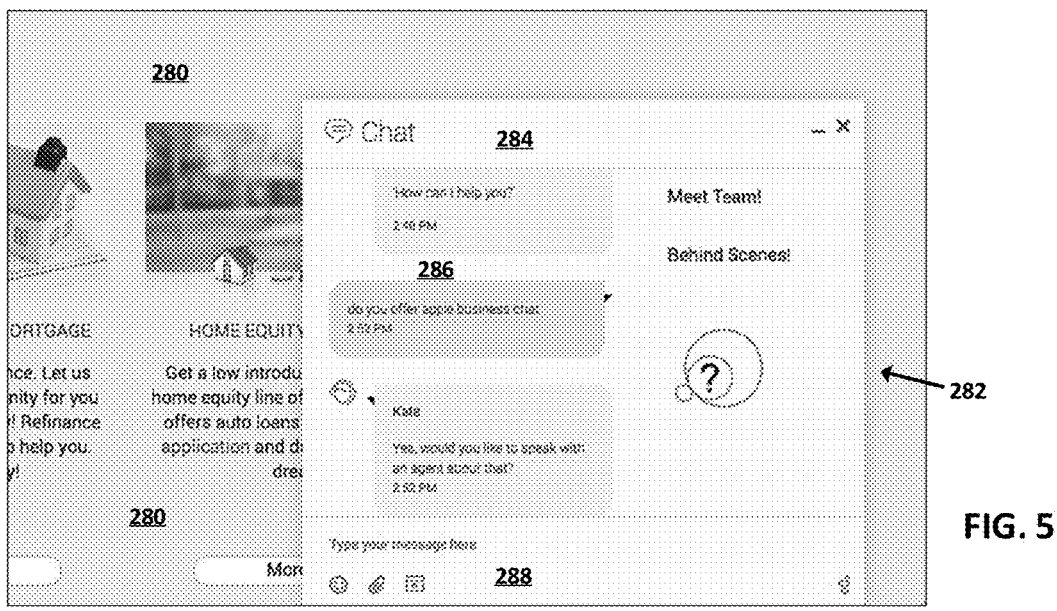
FIG. 5 is an exemplary customer chat interface according to embodiments of the present invention.

Turning to FIGS. 3, 4 and 5, various aspects of chat systems and chatbots are shown. As will be seen, present embodiments may include or be enabled by such chat features, which, in general, enable the exchange of text messages between different parties. Those parties may include live persons, such as customers and agents, as well as automated processes, such as bots or chatbots.

By way of background, a bot (also known as an "Internet bot") is a software application that runs automated tasks or scripts over the Internet. Typically, bots perform tasks that are both simple and structurally repetitive at a much higher rate than would be possible for a person. A chatbot is a particular type of bot and, as used herein, is defined as a piece of software and/or hardware that conducts a conversation via auditory or textual methods. As will be appreciated, chatbots are often designed to convincingly simulate how a human would behave as a conversational partner. Chatbots are typically used in dialog systems for various practical purposes including customer service or information acquisition. Some chatbots use sophisticated natural language processing systems, while simpler ones scan for keywords within the input and then select a reply from a database based on matching keywords or wording pattern.

Before proceeding further with the description of the present invention, an explanatory note will be provided in regard to referencing system components—e.g., modules, servers, and other components—that have already been introduced in any previous figure. Whether or not the subsequent reference includes the corresponding numerical identifiers used in the previous figures, it should be understood that the reference incorporates the example described in the previous figures and, unless otherwise specifically limited, may be implemented in accordance with either that examples or other conventional technology capable of fulfilling the desired functionality, as would be understood by one of ordinary skill in the art. Thus, for example, subsequent mention of a "contact center system" should be understood as referring to the exemplary "contact center system 200" of FIG. 2 and/or other conventional technologies for implementing a contact center system. As additional examples, a subsequent mention below to a "customer device", "agent device", "chat server", or "computing device" should be understood as referring to the exemplary "customer device 205", "agent device 230", "chat server 240", or "computing device 200", respectively, of FIGS. 1-2, as well as conventional technology for fulfilling the same functionality.

Chat features and chatbots will now be discussed in greater specificity with reference to the exemplary embodiments of a chat server, chatbot, and chat interface depicted, respectively, in FIGS. 3, 4, and 5. While these examples are provided with respect to chat systems implemented on the contact center-side, such chat systems may be used on the customer-side of an interaction. Thus, it should be understood that the exemplary chat systems of FIGS. 3, 4, and 5 may be modified for analogous customer-side implementation, including the use of customer-side chatbots configured to interact with agents and chatbots of contact centers on a customer's behalf. It should further be understood that chat features may be utilized by voice communications via converting text-to-speech and/or speech-to-text.

Referring specifically now to FIG. 3, a more detailed block diagram is provided of a chat server 240, which may be used to implement chat systems and features. The chat server 240 may be coupled to (i.e., in electronic communication with) a customer device 205 operated by the customer over a data communications network 210. The chat server 240, for example, may be operated by a enterprise as part of a contact center for implementing and orchestrating chat conversations with the customers, including both automated chats and chats with human agents. In regard to automated chats, the chat server 240 may host chat automation modules or chatbots 260A-260C (collectively referenced as 260), which are configured with computer program instructions for engaging in chat conversations. Thus, generally, the chat server 240 implements chat functionality, including the exchange of text-based or chat communications between a customer device 205 and an agent device 230 or a chatbot 260. As discussed more below, the chat server 240 may include a customer interface module 265 and agent interface module 266 for generating particular UIs at the customer device 205 and the agent device 230, respectively, that facilitate chat functionality.

In regard to the chatbots 260, each can operate as an executable program that is launched according to demand. For example, the chat server 240 may operate as an execution engine for the chatbots 260, analogous to loading VoiceXML files to a media server for interactive voice response (IVR) functionality. Loading and unloading may be controlled by the chat server 240, analogous to how a VoiceXML script may be controlled in the context of an interactive voice response. The chat server 240 may further provide a means for capturing and collecting customer data in a unified way, similar to customer data capturing in the context of IVR. Such data can be stored, shared, and utilized in a subsequent conversation, whether with the same chatbot, a different chatbot, an agent chat, or even a different media type. In example embodiments, the chat server 240 is configured to orchestrate the sharing of data among the various chatbots 260 as interactions are transferred or transitioned over from one chatbot to another or from one chatbot to a human agent. The data captured during interaction with a particular chatbot may be transferred along with a request to invoke a second chatbot or human agent.

In exemplary embodiments, the number of chatbots 260 may vary according to the design and function of the chat server 240 and is not limited to the number illustrated in FIG. 3. Further, different chatbots may be created to have different profiles, which can then be selected between to match the subject matter of a particular chat or a particular customer. For example, the profile of a particular chatbot may include expertise for helping a customer on a particular subject or communication style aimed at a certain customer preference. More specifically, one chatbot may be designed to engage in a first topic of communication (e.g., opening a new account with the business), while another chatbot may be designed to engage in a second topic of communication (e.g., technical support for a product or service provided by the business). Or, chatbots may be configured to utilize different dialects or slang or have different personality traits or characteristics. Engaging chatbots with profiles that are catered to specific types of customers may enable more effective communication and results. The chatbot profiles may be selected based on information known about the other party, such as demographic information, interaction history, or data available on social media. The chat server 240 may host a default chatbot that is invoked if there is insufficient information about the customer to invoke a more specialized chatbot. Optionally, the different chatbots may be customer selectable. In exemplary embodiments, profiles of chatbots 260 may be stored in a profile database hosted in the storage device 220. Such profiles may include the chatbot's personality, demographics, areas of expertise, and the like.

The customer interface module 265 and agent interface module 266 may be configured to generating user interfaces (UIs) for display on the customer device 205 that facilitate chat communications between the customer and a chatbot 260 or human agent. Likewise, an agent interface module 266 may generate particular UIs on the agent device 230 that facilitate chat communications between an agent operating an agent device 230 and the customer. The agent interface module 266 may also generate UIs on an agent device 230 that allow an agent to monitor aspects of an ongoing chat between a chatbot 260 and a customer. For example, the customer interface module 265 may transmit signals to the customer device 205 during a chat session that are configured to generated particular UIs on the customer device 205, which may include the display of the text messages being sent from the chatbot 260 or human agent as well as other non-text graphics that are intended to accompany the text messages, such as emoticons or animations. Similarly, the agent interface module 266 may transmit signals to the agent device 230 during a chat session that are configured to generated UIs on the agent device 230. Such UIs may include an interface that facilitates the agent selection of non-text graphics for accompanying outgoing text messages to customers.

In exemplary embodiments, the chat server 240 may be implemented in a layered architecture, with a media layer, a media control layer, and the chatbots executed by way of the IMR server 216 (similar to executing a VoiceXML on an IVR media server). As described above, the chat server 240 may be configured to interact with the knowledge management server 234 to query the server for knowledge information. The query, for example, may be based on a question received from the customer during a chat. Responses received from the knowledge management server 234 may then be provided to the customer as part of a chat response.

Referring specifically now to FIG. 4, a block diagram is provided of an exemplary chat automation module or chatbot 260. As illustrated, the chatbot 260 may include several modules, including a text analytics module 270, dialog manager 272, and output generator 274. It will be appreciated that, in a more detailed discussion of chatbot operability, other subsystems or modules may be described, including, for examples, modules related to intent recognition, text-to-speech or speech-to-text modules, as well as modules related to script storage, retrieval, and data field processing in accordance with information stored in agent or customer profiles. Such topics, however, are covered more completely in other areas of this disclosure—for example, in relation to FIGS. 6 and 7—and so will not be repeated here. It should nevertheless be understood that the disclosures made in these areas may be used in analogous ways toward chatbot operability in accordance with functionality described herein.

The text analytics module 270 may be configured to analyze and understand natural language. In this regard, the text analytics module may be configured with a lexicon of the language, syntactic/semantic parser, and grammar rules for breaking a phrase provided by the customer device 205 into an internal syntactic and semantic representation. The configuration of the text analytics module depends on the particular profile associated with the chatbot. For example, certain words may be included in the lexicon for one chatbot but excluded that of another.

The dialog manager 272 receives the syntactic and semantic representation from the text analytics module 270 and manages the general flow of the conversation based on a set of decision rules. In this regard, the dialog manager 272 maintains a history and state of the conversation and, based on those, generates an outbound communication. The communication may follow the script of a particular conversation path selected by the dialog manager 272. As described in further detail below, the conversation path may be selected based on an understanding of a particular purpose or topic of the conversation. The script for the conversation path may be generated using any of various languages and frameworks conventional in the art, such as, for example, artificial intelligence markup language (AIML), SCXML, or the like.

During the chat conversation, the dialog manager 272 selects a response deemed to be appropriate at the particular point of the conversation flow/script and outputs the response to the output generator 274. In exemplary embodiments, the dialog manager 272 may also be configured to compute a confidence level for the selected response and provide the confidence level to the agent device 230. Every segment, step, or input in a chat communication may have a corresponding list of possible responses. Responses may be categorized based on topics (determined using a suitable text analytics and topic detection scheme) and suggested next actions are assigned. Actions may include, for example, responses with answers, additional questions, transfer to a human agent to assist, and the like. The confidence level may be utilized to assist the system with deciding whether the detection, analysis, and response to the customer input is appropriate or whether a human agent should be involved. For example, a threshold confidence level may be assigned to invoke human agent intervention based on one or more business rules. In exemplary embodiments, confidence level may be determined based on customer feedback. As described, the response selected by the dialog manager 272 may include information provided by the knowledge management server 234.

In exemplary embodiments, the output generator 274 takes the semantic representation of the response provided by the dialog manager 272, maps the response to a chatbot profile or personality (e.g., by adjusting the language of the response according to the dialect, vocabulary, or personality of the chatbot), and outputs an output text to be displayed at the customer device 205. The output text may be intentionally presented such that the customer interacting with a chatbot is unaware that it is interacting with an automated process as opposed to a human agent. As will be seen, in accordance with other embodiments, the output text may be linked with visual representations, such as emoticons or animations, integrated into the customer's user interface.

Reference will now be made to FIG. 5, in which a webpage 280 having an exemplary implementation of a chat feature 282 is presented. The webpage 280, for example, may be associated with a enterprise website and intended to initiate interaction between prospective or current customers visiting the webpage and a contact center associated with the enterprise. As will be appreciated, the chat feature 282 may be generated on any type of customer device 205, including personal computing devices such as laptops, tablet devices, or smart phones. Further, the chat feature 282 may be generated as a window within a webpage or implemented as a full-screen interface. As in the example shown, the chat feature 282 may be contained within a defined portion of the webpage 280 and, for example, may be implemented as a widget via the systems and components described above and/or any other conventional means. In general, the chat feature 282 may include an exemplary way for customers to enter text messages for delivery to a contact center.

As an example, the webpage 280 may be accessed by a customer via a customer device, such as the customer device, which provides a communication channel for chatting with chatbots or live agents. In exemplary embodiments, as shown, the chat feature 282 includes generating a user interface, which is referred to herein as a customer chat interface 284, on a display of the customer device. The customer chat interface 284, for example, may be generated by the customer interface module of a chat server, such as the chat server, as already described. As described, the customer interface module 265 may send signals to the customer device 205 that are configured to generate the desired customer chat interface 284, for example, in accordance with the content of a chat message issued by a chat source, which, in the example, is a chatbot or agent named "Kate". The customer chat interface 284 may be contained within a designated area or window, with that window covering a designated portion of the webpage 280. The customer chat interface 284 also may include a text display area 286, which is the area dedicated to the chronological display of received and sent text messages. The customer chat interface 284 further includes a text input area 288, which is the designated area in which the customer inputs the text of their next message. As will be appreciated, other configurations are also possible.

Customer Automation Systems

Embodiments of the present invention include systems and methods for automating and augmenting customer actions during various stages of interaction with a customer service provider or contact center. As will be seen, those various stages of interaction may be classified as pre-contact, during-contact, and post-contact stages (or, respectively, pre-interaction, during-interaction, and post-interaction stages). With specific reference now to FIG. 6, an exemplary customer automation system 300 is shown that may be used with embodiments of the present invention. To better explain how the customer automation system 300 functions, reference will also be made to FIG. 7, which provides a flowchart 350 of an exemplary method for automating customer actions when, for example, the customer interacts with a contact center. Additional information related to customer automation are provided in U.S. application Ser. No. 16/151,362, filed on Oct. 4, 2018, entitled "System and Method for Customer Experience Automation", the content of which is incorporated herein by reference.

Figure 6:
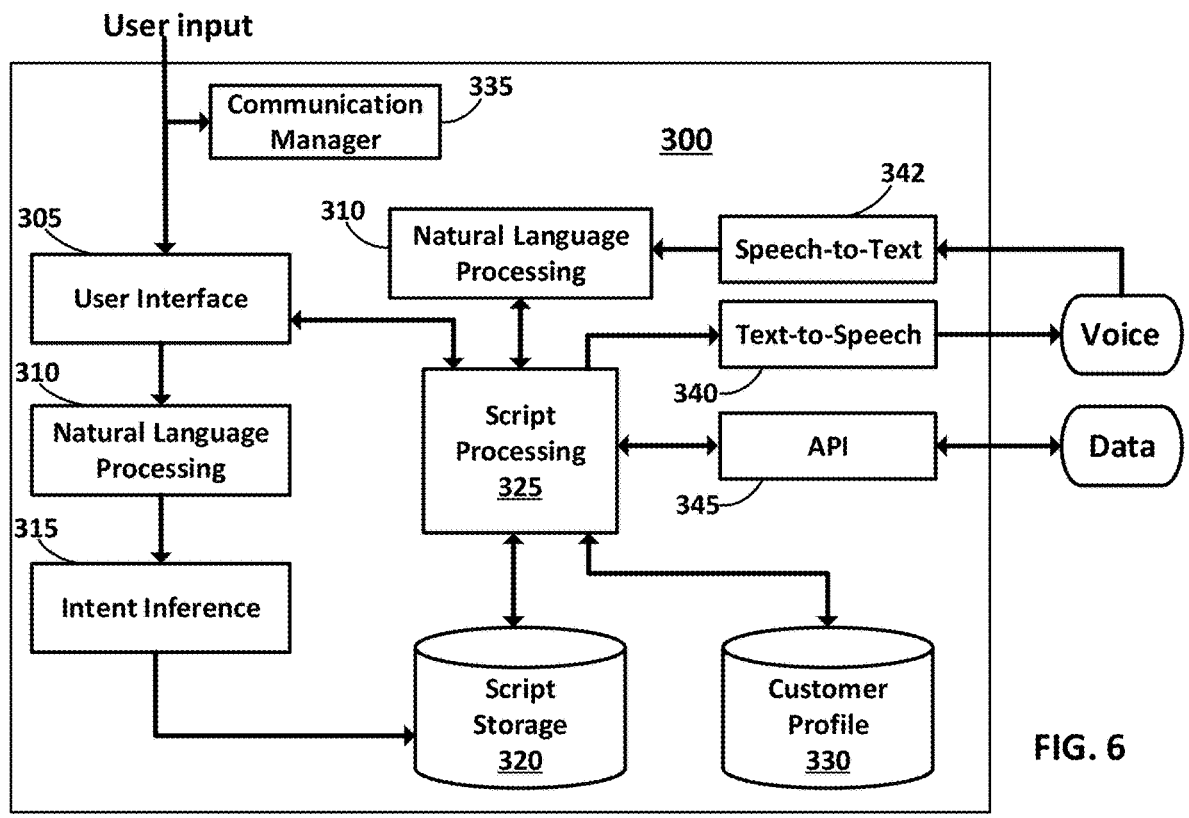
FIG. 6 is a block diagram of a customer automation system according to embodiments of the present invention.

The customer automation system 300 of FIG. 6 represents a system that may be generally used for customer-side automations, which, as used herein, refers to the automation of actions taken on behalf of a customer in interactions with customer service providers or contact centers. Such interactions may also be referred to as "customer-contact center interactions" or simply "customer interactions". Further, in discussing such customer-contact center interactions, it should be appreciated that reference to a "contact center" or "customer service provider" is intended to generally refer to any customer service department or other service provider associated with an organization or enterprise (such as, for example, a business, governmental agency, non-profit, school, etc.) with which a user or customer has business, transactions, affairs or other interests.

In exemplary embodiments, the customer automation system 300 may be implemented as a software program or application running on a mobile device or other computing device, cloud computing devices (e.g., computer servers connected to the customer device 205 over a network), or combinations thereof (e.g., some modules of the system are implemented in the local application while other modules are implemented in the cloud. For the sake of convenience, embodiments are primarily described in the context of implementation via an application running on the customer device 205. However, it should be understood that present embodiments are not limited thereto.

The customer automation system 300 may include several components or modules. In the illustrated example of FIG. 6, the customer automation system 300 includes a user interface 305, natural language processing (NLP) module 310, intent inference module 315, script storage module 320, script processing module 325, customer profile database or module (or simply "customer profile") 330, communication manager module 335, text-to-speech module 340, speech-to-text module 342, and application programming interface (API) 345, each of which will be described with more particularity with reference also to flowchart 350 of FIG. 7. It will be appreciated that some of the components of and functionalities associated with the customer automations system 300 may overlap with the chatbot systems described above in relation to FIGS. 3, 4, and 5. In cases where the customer automation system 300 and such chatbot systems are employed together as part of a customer-side implementation, such overlap may include the sharing of resources between the two systems.

Figure 7:
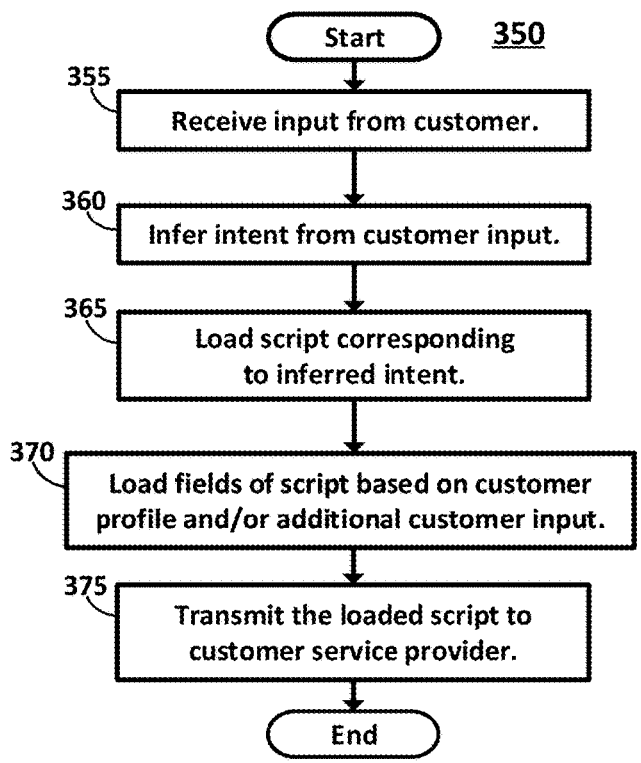
FIG. 7 is a flowchart of a method for automating an interaction on behalf of a customer according to embodiments of the present invention.

In an example of operation, with specific reference now to the flowchart 350 of FIG. 7, the customer automation system 300 may receive input at an initial step or operation 355. Such input may come from several sources. For example, a primary source of input may be the customer, where such input is received via the customer device. The input also may include data received from other parties, particularly parties interacting with the customer through the customer device. For example, information or communications sent to the customer from the contact center may provide aspects of the input. In either case, the input may be provided in the form of free speech or text (e.g., unstructured, natural language input). Input also may include other forms of data received or stored on the customer device.

Continuing with the flow diagram 350, at an operation 360, the customer automation system 300 parses the natural language of the input using the NLP module 310 and, therefrom, infers a intent using the intent inference module 315. For example, where the input is provided as speech from the customer, the speech may be transcribed into text by a speech-to-text system (such as a large vocabulary continuous speech recognition or LVCSR system) as part of the parsing by the NLP module 310. The transcription may be performed locally on the customer device 205 or the speech may be transmitted over a network for conversion to text by a cloud-based server. In certain embodiments, for example, the intent inference module 315 may automatically infer the customer's intent from the text of the provided input using artificial intelligence or machine learning techniques. Such artificial intelligence techniques may include, for example, identifying one or more keywords from the customer input and searching a database of potential intents corresponding to the given keywords. The database of potential intents and the keywords corresponding to the intents may be automatically mined from a collection of historical interaction recordings. In cases where the customer automation system 300 fails to understand the intent from the input, a selection of several intents may be provided to the customer in the user interface 305. The customer may then clarify their intent by selecting one of the alternatives or may request that other alternatives be provided.

After the customer's intent is determined, the flowchart 350 proceeds to an operation 365 where the customer automation system 300 loads a script associated with the given intent. Such scripts, for example, may be stored and retrieved from the script storage module 320. Such scripts may include a set of commands or operations, pre-written speech or text, and/or fields of parameters or data (also "data fields"), which represent data that is required to automate an action for the customer. For example, the script may include commands, text, and data fields that will be needed in order to resolve the issue specified by the customer's intent. Scripts may be specific to a particular contact center and tailored to resolve particular issues. Scripts may be organized in a number of ways, for example, in a hierarchical fashion, such as where all scripts pertaining to a particular organization are derived from a common "parent" script that defines common features. The scripts may be produced via mining data, actions, and dialogue from previous customer interactions. Specifically, the sequences of statements made during a request for resolution of a particular issue may be automatically mined from a collection of historical interactions between customers and customer service providers. Systems and methods may be employed for automatically mining effective sequences of statements and comments, as described from the contact center agent side, are described in U.S. patent application Ser. No. 14/153,049 "Computing Suggested Actions in Caller Agent Phone Calls By Using Real-Time Speech Analytics and Real-Time Desktop Analytics," filed in the United States Patent and Trademark Office on Jan. 12, 2014, the entire disclosure of which is incorporated by reference herein.

With the script retrieved, the flowchart 350 proceeds to an operation 370 where the customer automation system 300 processes or "loads" the script. This action may be performed by the script processing module 325, which performs it by filling in the data fields of the script with appropriate data pertaining to the customer. More specifically, the script processing module 325 may extract customer data that is relevant to the anticipated interaction, with that relevance being predetermined by the script selected as corresponding to the customer's intent. The data for many of the data fields within the script may be automatically loaded with data retrieved from data stored within the customer profile 330. As will be appreciated, the customer profile 330 may store particular data related to the customer, for example, the customer's name, birth date, address, account numbers, authentication information, and other types of information relevant to customer service interactions. The data selected for storage within the customer profile 330 may be based on data the customer has used in previous interactions and/or include data values obtained directly by the customer. In case of any ambiguity regarding the data fields or missing information within a script, the script processing module 325 may include functionality that prompts and allows the customer to manually input the needed information.

Referring again to the flowchart 350, at an operation 375, the loaded script may be transmitted to the customer service provider or contact center. As discussed more below, the loaded script may include commands and customer data necessary to automate at least a part of an interaction with the contact center on the customer's behalf. In exemplary embodiments, an API 345 is used so to interact with the contact center directly. Contact centers may define a protocol for making commonplace requests to their systems, which the API 345 is configured to do. Such APIs may be implemented over a variety of standard protocols such as Simple Object Access Protocol (SOAP) using Extensible Markup Language (XML), a Representational State Transfer (REST) API with messages formatted using XML or JavaScript Object Notation (JSON), and the like. Accordingly, the customer automation system 300 may automatically generate a formatted message in accordance with a defined protocol for communication with a contact center, where the message contains the information specified by the script in appropriate portions of the formatted message.

Personal Bot

Figure 8:
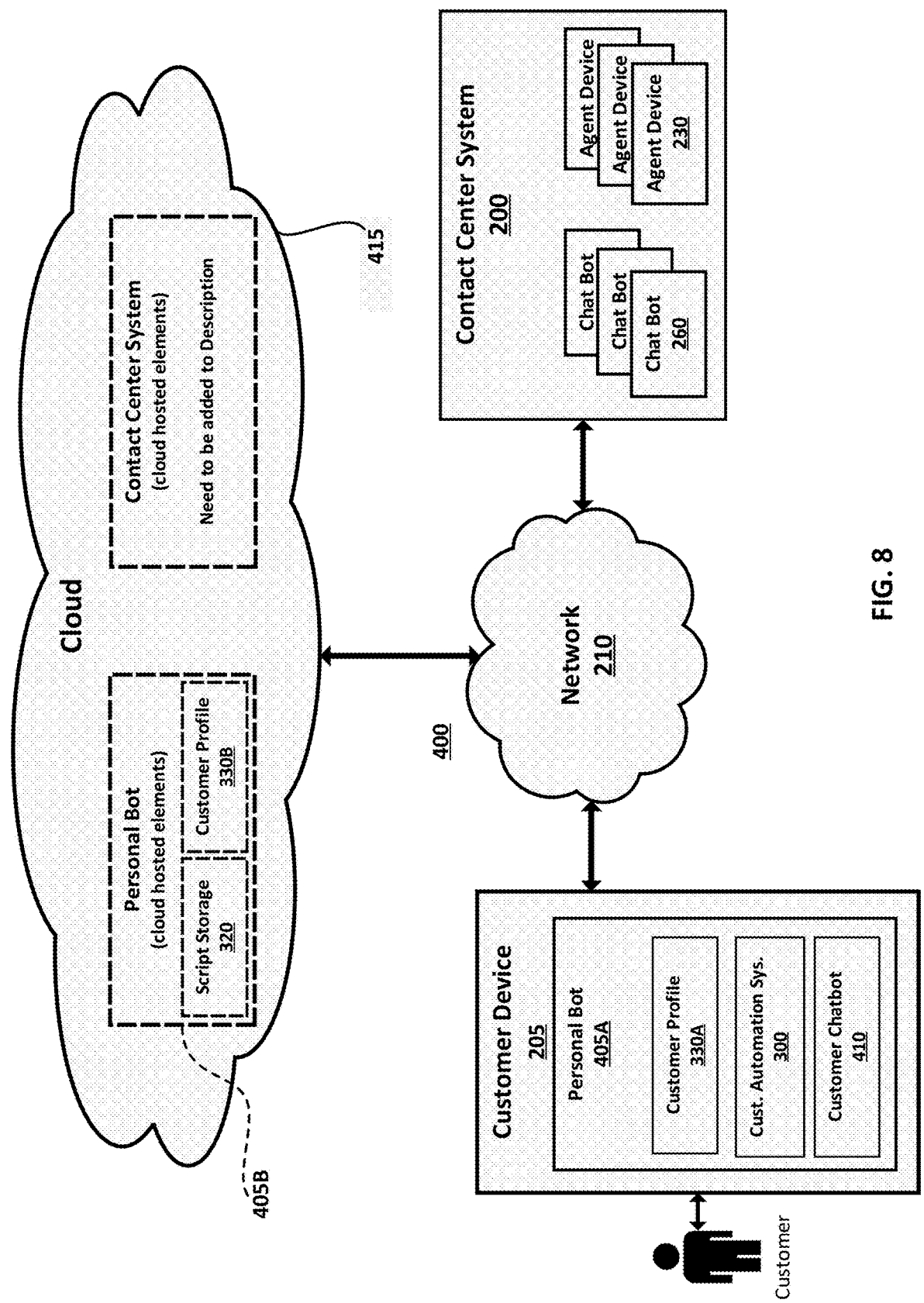
FIG. 8 is a block diagram of an automated personal bot for a customer according to embodiments of the present invention.

With reference now to FIG. 8, an exemplary system 400 is shown that includes an automated personal assistant or, as referred to herein, personal bot 405. As will be seen, the personal bot 405 is configured to automate aspects of interactions with a customer service provider on behalf of a customer. As stated above, present invention relates to systems and methods for automating aspects of the customer-side of the interactions between customers and customer service providers or contact centers. Accordingly, the personal bot 405 may provide ways to automate actions that customers are required to perform when contacting, interacting, or following up with contact centers.

The personal bot 405, as used herein, may generally reference any customer-side implementation of any of the automated processes or automation functionality described herein. Thus, it should be understood that, unless otherwise specifically limited, the personal bot 405 may generally employ any of the technologies discussed herein—including those related to the chatbots 260 and the customer automation system 300—to enable or enhance automation services available to customers. For example, as indicated in FIG. 8, the personal bot 405 may include the functionality of the above-described customer automation system 300. Additionally, the personal bot 405 may include a customer-side implementation of a chatbot (for example, the chatbot 260 of FIGS. 4 and 5), which will be referred herein as a customer chatbot 410. As will be seen, the customer chatbot 410 may be configured to interact privately with the customer in order to obtain feedback and direction from the customer pertaining to actions related to ongoing, future, or past interactions with contact centers. Further, the customer chatbot 410 may be configured to interact with live agents or chatbots associated with a contact center on behalf of the customer.

As shown in FIG. 8, in regard to system architecture, the personal bot 405 may be implemented as a software program or application running on a mobile device or personal computing device (shown as a customer device 205) of the customer. For example, the personal bot 405A may include locally stored modules, including the customer automation system 300, the customer chatbot 410, and elements of the customer profile 330A. The personal bot 405 also may include remote or cloud computing components (e.g., one or more computer servers or modules connected to the customer device 205 over a network 210), which may be hosted in a cloud computing environment or cloud 415 (see cloud hosted elements of the personal bot 405B). For example, as shown in the illustrated example, the script storage module 320 and elements of the customer profile 330B may be stored in databases in the cloud 415. It should be understood, however, that present embodiments are not limited to this arrangement and, for example, may include other components being implemented in the cloud 415.

Accordingly, as will be seen, embodiments of the present invention include systems and methods for automatically initiating and conducting an interaction with a contact center to resolve an issue on behalf of a customer. Toward this objective, the personal bot 405 may be configured to automate particular aspects of interactions with a contact center on behalf of the customer. Several examples of these types of embodiments will now be discussed in which resources described herein—including the customer automation system 300 and customer chatbot 410—are used to provide the necessary automation. In presenting these embodiments, reference is again made to previously incorporated U.S. application Ser. No. 16/151,362, entitled "System and Method for Customer Experience Automation", which includes further background and other supporting materials.

Pre-Interaction Automation

Embodiments of the present invention include the personal bot 405 and related resources automating one or more actions or processes by which the customer initiates a communication with a contact center for interacting therewith. As will be seen, this type of automation is primarily aimed at those actions normally occurring within the pre-contact or pre-interaction stage of customer interactions.

For example, in accordance with an exemplary embodiment, when a customer chooses to contact a contact center, the customer automation system 300 may automate the process of connecting the customer with the contact center. For example, present embodiments may automatically navigate an IVR system of a contact center on behalf of the customer using a loaded script. Further, the customer automation system 300 may automatically navigate an IVR menu system for a customer, including, for example, authenticating the customer by providing authentication information (e.g., entering a customer number through dual-tone multi-frequency or DTMF or "touch tone" signaling or through text to speech synthesis) and selecting menu options (e.g., using DTMF signaling or through text to speech synthesis) to reach the proper department associated with the inferred intent from the customer's input. More specifically, the customer profile 330 may include authentication information that would typically be requested of customers accessing customer support systems such as usernames, account identifying information, personal identification information (e.g., a social security number), and/or answers to security questions. As additional examples, the customer automation system 300 may have access to text messages and/or email messages sent to the customer's account on the customer device 205 in order to access one-time passwords sent to the customer, and/or may have access to a one-time password (OTP) generator stored locally on the customer device 205. Accordingly, embodiments of the present invention may be capable of automatically authenticating the customer with the contact center prior to an interaction.

In addition, the customer automation system 300 may facilitate a customer contacting a contact center via multiple channels for communication, such as, call (e.g., voice and/or video), chat, or e-mail. In exemplary embodiments, the communication channels may include calling, chatting, and leaving a message. Estimated wait times for interactions with a live agent (e.g., call or chat) may also be shown to the customer. For example, if the customer chooses to call and speak with a live agent, the customer may be offered several options. These options might include to wait (e.g., "dial now and wait"), select a callback (e.g., "dial now and skip waiting"), or schedule a call for a given time (e.g., "schedule a callback"). In exemplary embodiments, if the customer selects to schedule a call for a given time by opting for "schedule a callback," for example, the customer automation system 300 may access the customer's calendar (stored/accessible on the same customer device 205) and offer suggestions for free times in the customer's calendar. The customer automation system 300 may determine that the customer is free at particular times over the next two days. These times may be automatically presented to the customer for selection thereby. The customer may also choose to schedule the call at another time and input this into the user interface 305. Certain embodiments of the present invention may enable callback scheduling even when contact centers do not directly support such a feature. For example, assuming that the customer has scheduled a callback for 10:00 am, the system may automatically determine the approximate wait time during the time periods leading up to 10:00 am. This might be based on historical data captured from other customers contacting this particular organization or it may be based on wait time data published by the contact center. Thus, in accordance with exemplary embodiments, the customer automation system 300 automatically connects to the contact center at a time prior to the scheduled call back time, based on the expected wait time, and supplies the set of information provided to the customer automation system 300 in accordance with the script in order to be placed on hold by the contact center. For example, the customer automation system 300 may automatically determine that the expected wait time at 09:15 is 45 minutes, and therefore initiates communication with the contact center at 09:15 in order have an agent available to speak to the customer at around 10:00. When the customer automation system 300 is connected to a live contact center agent (e.g., by detecting a ringing on the contact center end of the communication channel or by detecting a voice saying "hello"), an automatic notification may be sent to the customer (e.g., by ringing at the customer device 205) and then the customer may be connected to the live agent.

In accordance with other embodiments, the customer automation system 300 may automate a process for preparing an agent before a call from a customer. For example, the customer automation system 300 may send a request that the agent study certain materials provided by the customer before the live call happens.

During-Interaction Automation

Embodiments of the present invention further include the personal bot 405 and related resources automating the actual interaction (or aspects thereof) between the customer and a contact center. As will be seen, this type of automation is primarily aimed at those actions normally occurring within the during-contact or during-interaction stage of customer interactions.

For example, the customer automation system 300 may interact with entities within a contact center on behalf of the customer. Without limitation, such entities may include automated processes, such as chatbots, and live agents. Once connected to the contact center, the customer automation system 300 may retrieve a script from the script storage module 320 that includes an interaction script (e.g., a dialogue tree). The interaction script may generally consist of a template of statements for the customer automation system 300 to make to an entity within the contact center, for example, a live agent. In exemplary embodiments, the customer chatbot 410 may interact with the live agent on the customer's behalf in accordance with the interaction script.

As already described, the interaction script (or simply "script") may consist of a template having defined dialogue (i.e., predetermined text or statements) and data fields. As previously described, to "load" the script, information or data pertinent to the customer is determined and loaded into the appropriate data fields. Such pertinent data may be retrieved from the customer profile 330 and/or derived from input provided by the customer through the customer interface 305. According to certain embodiments, the customer chatbot 410 also may be used to interact with the customer to prompt such input so that all of the necessary data fields within the script are filled. In other embodiments, the script processing module 325 may prompt the customer to supply any missing information (e.g., information that is not available from the customer profile 330) to fill in blanks in the template through the user interface 305 prior to initiating a communication with the contact center. In certain embodiments, the script processing module 325 may also request that the customer confirm the accuracy of all of the information that the customer automation system 300 will provide to the contact center.

Once the loaded script is complete, for example, the interaction with the live agent may begin with an initial statement explaining the reason for the call (e.g., "I am calling on behalf of your customer, Mr. Thomas Anderson, regarding what appears to be double billing."), descriptions of particular details related to the issue (e.g., "In the previous three months, his bill was approximately fifty dollars. However, his most recent bill was for one hundred dollars."), and the like. While such statements may be provided in text to the contact center, it may also be provided in voice, for example, when interacting with a live agent. In regard to how such an embodiment may function, a speech synthesizer or text-to-speech module 340 may be used to generate speech to be transmitted to the contact center agent over a voice communication channel. Further, speech received from the agent of the contact center may be converted to text by a speech-to-text converter 342, and the resulting text then may be processed by the customer automation system 300 or customer chatbot 410 so that an appropriate response in the dialogue tree may be found. If the agent's response cannot be processed by the dialogue tree, the customer automation system 300 may ask the agent to rephrase the response or may connect the customer to the agent in order to complete the transaction.

While the customer automation system 300 is conducting the interaction with the live agent in accordance with the interaction script, the agent may indicate their readiness or desire to speak to the customer. For the agent, readiness might occur after reviewing all of the media documents provided to the agent by the customer automation system 300 and/or after reviewing the customer's records. In exemplary embodiments, the script processing module 325 may detect a phrase spoken by the agent to trigger the connection of the customer to the agent via the communication channel (e.g., by ringing the customer device 205 of the customer). Such triggering phrases may be converted to text by the speech-to-text converter 342 and the natural language processing module 310 then may determine the meaning of the converted text (e.g., identifying keywords and/or matching the phrase to a particular cluster of phrases corresponding to a particular concept).

As another example, the customer automation system 300 may present automatically generated "quick actions" to the customer based on the customer's inferred intent and other data associated with the ongoing interaction. In some circumstances, the "quick actions" require no further input from the customer. For example, the customer automation system 300 may suggest sending an automatically generated text or email message to the contact center directly from a main menu screen, where the message describes the customer's issue. The message may be generated automatically by the script processing module based on a message template provided by the script, where portions of the template that contain customer-specific and incident-specific data are automatically filled in based on data collected about the customer (e.g., from the customer profile) and that the customer has supplied (e.g., as part of the initial customer input). For example, in the case where the customer input references a question about a possible double billing by a particular service provider, the script processing module 325 can reference previous billing statements, which may be stored as part of the customer profile 330, to look for historical charges. The customer automation system 300 infers from these previous billing statements that the amount charged for the period in question was unusually high. In such cases, the system may automatically generate a message which may contain the information about the customer's typical bills and the problem with the current bill. The customer can direct the customer automation system 300 to send the automatically generated message directly to the contact center associated with the service provider. In exemplary embodiments, the script may provide multiple templates, and the customer may select from among the templates and/or edit a message prior to sending, in order to match the customer's personality or preferred tone of voice.

In other exemplary embodiments, the personal bot 405 may automate processes that augment a current or ongoing interaction between the customer and a contact center (e.g., between the customer and either a chatbot or a live agent of the contact center). While the personal bot 405 may not handle the interaction in such embodiments, the personal bot may work behind the scenes to facilitate the customer's interaction with a contact center, so to increase the likelihood of a desirable outcome for the customer. In such embodiments, once the interaction has been initiated with a live agent, meta-data regarding the interaction may be displayed to the customer in the user interface 305. This may be done throughout the interaction, with the information being update based on the progression of the ongoing interaction. Examples of such information might include, but not be limited to, name of the contact center, name of the department reached, reason for the call, name of the contact center agent, name of other agents who were on the call, etc. According to exemplary embodiments, this type of information may include a transcript of the ongoing call so that the customer can easily look back at previous statements. In addition, the customer automation system 300 may display other types of information to the customer that is found pertinent given, for example, the recognition of certain key words within the transcript of the ongoing conversation. That is, the customer automation system 300 may push relevant content from a knowledge base (e.g., the knowledge system 238 of FIG. 2) to the customer given the content of the transcript of the interaction.

The customer automation system 300 also may enable the customer and agent to share relevant content with each other throughout the interaction. For example, in one embodiment, the agent or customer may share screens, documents (contracts, warranties, etc.), photos, and other files with each other. Other files may also be shared, such as screenshots of content captured by one of the parties during the conversation, a current view from a camera, links, photographs of broken or failed products, screenshots of error messages, copies of documents, proofs of purchase, or any other supporting file. The customer automation system 300, thus, may provide functionality that facilitates the customer supplying or sharing additional or augmenting material to an agent of the contact center that is relevant to an ongoing interaction. To do this, for example, a supplemental communication channels (e.g., a data channel) is established in parallel to the primary communication channel (e.g., a voice communication channel or a text communication channel) to transfer the augmenting information between the customer and the contact center agent. In certain embodiments, these documents may be provided along with an automatically generated "quick actions" message. For example, such quick action messages may prompt the customer to take a photo of the broken part, for inclusion in the shared material.

In accordance with other embodiments, the communication manager 335 monitors conditions for a customer based on specified intents and automatically generates notifications to be presented to the customer through the user interface 305. For example, based the previous activity of the customer (for example, the customer's billing statements, which may be stored in the customer profile 330, and communications from different contact centers), the communication manager 335 may automatically generate notifications which might be of interest to the customer. Examples of a notification generated by the communication manager may include a reminder about the upcoming expiration of a deal, an offer of a new deal, actions for the customer, and the like. For example, the notification may offer quick actions that can be performed directly from the notification screen, such as how to get a specific deal, call a contact center about a specific deal, search for more deals, cancel a service, etc. The communication manager 335 may customize notifications to the customer based on the customer's previous deals, billing statements, crowd-sourced information about how similar customers reacted to deals, personal preferences, and the like. The communication manager 335 may provide such functionality through the user interface 305 for the customer to search for more deals based on their needs. Should the customer select this option, the customer automation system 300 may present some relevant deals that are identified from a database of deals.

In accordance with other embodiments, the customer automation system 300 may provide 'end of deal' notifications. In such cases, the customer is informed about the ending of deal, contract, business arrangement, or the like. For example, a customer may be notified about the ending of an internet package deal with their current internet service provider (ISP). The customer may be presented with the best deals offered by their current ISP and the best deals offered by other ISPs. Continuing with this example, the customer automation system 300 may offer specific deals without requiring communication with the contact center, such as a call-in to the relevant customer service department. Pricing may also be shown along with other comparisons relevant to the customer. For example, promotional offers may be compared to the average usage of the customer (e.g., based on the customer profile) and current pricing of their plan. Other suggested options that are specific to the customer intent in the notification may also be presented, such as a "cancel service" option and an option to "search more deals." Should the customer select the "cancel service" option, the customer automation system 300 may send a cancellation request to the contact center automatically. The customer automation system 300 may also search for more deals which fit the customer's needs and present these whether the customer has selected to cancel their service or just search for additional deals. These may also be presented to the customer.

According to other embodiments, the customer automation system 300 may monitor statements made by the contact center agent and automatically offers guidance to the customer in real-time. For example, the customer automation system 300 converts the contact center agent's speech to text using the speech-to-text converter 342 and processes the text using the natural language processing module 310. In exemplary embodiments, the natural language processing module 310 detects when the agent is making an offer and compares it to a database of other offers made by agents of the organization that the customer is speaking with. This database of other offers is crowdsourced from other customers. After identifying a corresponding matching offer in the database, the ranking of the offer compared to other offers is identified in order to determine whether the agent could make a better offer.

According to still other embodiments, the customer automation system 300 may present information to the customer about prior interactions with a particular contact center or organization. For example, such information may be retrieved during an ongoing interaction to show the current agent what other agents have said.

Customer Privacy Automation

Embodiments of the present invention further include the personal bot 405 and related resources functioning to automate aspects related to privacy for a customer. More particularly, the customer automation system 300 of the personal bot 405 may allow customers to manage privacy or data sharing with organizations and corresponding contact centers.

In accordance with exemplary embodiments, for example, the customer automation system 300 may facilitate the customer managing settings for privacy and data sharing (or simply "data sharing settings") globally, for example, across all providers and data types. The customer is enabled to manage data sharing settings on a per-organization basis by choosing which data type to share with each specific organization. As another example, the customer is enabled to manage data (e.g., data within a customer profile) according to data type. In such cases, the customer may choose which organization or which types of organizations to share each particular data type. In more detail, each field of data in the customer profile may be associated with at least one permission setting (e.g., in exemplary embodiments, each field of data may have a different permission setting for each provider). Further, user interfaces may be provided through the customer device 205 that allow the customer to adjusting data sharing settings and/or permission settings. Within such user interfaces, data sharing settings or permission settings may be made adjustable on a per data type, per organization basis, per type of organization basis, etc.

In accordance with exemplary embodiments, the customer automation system 300 may offer a plurality of levels for data sharing settings or permission settings. For example, in one embodiment, three different levels of permission settings are offered: share data, share anonymous data, and do not share any data. Anonymous data may include, for example, genericized information about the customer such as gender, zip code of residence, salary band, etc. Some aspects of embodiments of the present invention may enable compliance with the General Data Protection Regulation (GDPR) of the European Union (EU). In other embodiments, the customer automation system 300 provides functionality for a customer to exercise the "right to be forgotten" with all organizations (e.g., providers and/or business) that the customer has interacted with. In other embodiments, the customer can switch on/off the sharing of each of the data types. When selecting a specific data type, the customer can select to send this data in an anonymized form to the provider or to delete the previously shared data with a particular organization. Additionally, the customer can delete all data types that were previously shared with an organization, for example, by clicking on the 'trash' button provided in the customer interface. According to one embodiment of the present invention, the deletion of the data may include the customer automation system 300 loading an appropriate script from the script storage module 320 in order to generate a formal request to the associated organization to delete the specified data. As noted above, for example, the customer automation system 300 may be used to make such request by initiating a communication with a live agent of the organization or by accessing an application programming interface provided by the organization.

Post-Interaction Automation

Embodiments of the present invention include methods and systems for identifying outstanding matters or pending actions for a customer that need additional attention or follow-up, where those pending actions were raised during an interaction between the customer and a contact center. Once identified, other embodiments of the present invention include methods and systems for automating follow-up actions on behalf of the customer for moving such pending actions toward a resolution. For example, via the automation resources disclosed herein, the personal bot 405 may automate subsequent or follow-up actions on behalf of a customer, where those follow-up actions relate to actions pending from a previous interaction with a customer service provider. As will be appreciated, this type of automation is primarily aimed at those actions normally occurring within the post-contact or post-interaction stage of a customer interaction, however it also includes the automation of action that also can be characterized as preceding or prompting a subsequent customer interaction.

Turning to other aspects of the present invention, systems and methods will now be presented for measuring or evaluating characteristics, capabilities, and, more specifically, an intelligence quotient, for automated resources, virtual assistants, personal bots, and/or chatbots, which will be referred to generally as "bots". As will be seen, aspects of the present invention may be particularly applicable to cases where such bots are used in customer engagement scenarios within multichannel environments.

As will be appreciated, bots may be characterized in accordance with the manner in which the "intelligence" of the bot is derived. A first type includes bots based on rules, which will be referred to as a rule-based bot. This type of bot generally derives useful functionality from specifically defined rules and logic, such as those captured within decision trees. Rule-based bots generally requires less infrastructure and, because they are designed to provide linear and single dimensional support, require less resources to build and deploy. A second type includes bots powered by AI, which will be referred to herein as an AI-powered bot. As will be appreciated, AI-powered bots are powered by artificial intelligence, for example, machine learning or learning based on deep neural networks. AI-powered bots are generally much more costly to develop and deploy than rule-based bots. For example, AI-powered bots typically require a learning center with natural language processing in order to apply intelligence and convert knowledge into a decision-making capability, which may include the ability to complete complex tasks. The intelligence of an AI-powered bot can be developed over a lengthy period by learning in accordance with a training dataset that grows as the AI-powered bots handles customer interactions and data from those interactions is gathered. The results represented in that data can be used to correct areas of weakness.

In short, the capabilities and intelligence characteristics of bots can vary significantly depending on the type of the bot—including mechanisms that drive intelligence—as well as the manner in which the bot is developed, the intended use of the both, the manner in which the bot is trained, and other factors.

A significant characteristic for any bot relates to its cognitive capabilities or intelligence. A particular term—"robotic intelligence quotient" or simply "RIQ"—will be used to refer to this bot characteristic. Thus, as used herein, RIQ refer to a quantitative measurement of the intelligence or intelligence quotient of bots. Just as intelligence quotient (IQ) tests provide a score that helps gauge human cognitive abilities, RIQ provides a similar measure for the cognitive abilities of bots. As will be seen, the measure may be particularly utilized in relation to evaluating the real intelligence of AI-powered bots. In example embodiments, this may include comparing the intelligence of a subject AI-powered bot with other bots, which may be AI-powered or rule-based, or humans.

As an example, an interactive voice response (IVR) system, which are utilized by many contact centers to interact with customers, represents a type of bot. In legacy or conventional applications, this type of bot (which will be referred to as an "IVR bot") typically was configured as somewhat limited rule-based bot. In such cases, an IVR bot may include a cognitive engine that, pursuant to a decision tree that defines input/responses pairing, allows it to receive and process inputs from humans and then respond in a defined way with a computer-generated voice. This type of bot generally had very limited intelligence because input capabilities in past system were also very limited. Such IVR bots also were further limited to a single channel allowing only telephonic touch points. On a scale of intelligence quotient or RIQ, legacy IVR bots would typically rate as being on a lower or minimum level. This is due to the IVR bots being minimally capable of processing complex requests or replacing anything but the simplest types of human work.

In accordance with the present invention, the cognitive abilities or RIQ of bots may be evaluated in regard to particular capabilities that relate to a specific business context, which may also be referred to herein as an "engagement scenario". Further, the evaluation of RIQ may be made in relation to one or more particular channels. As will be appreciated, such term "channel" refers to the communication channel that is being utilized by the contact center to communicate or interact with a user or customer. Typically, contact centers support communications over several communication channels, including voice or telephone, chat, text, email, video conferencing, screen or file sharing, and the like. A channel for a given bot may be further defined by considering the manner in which both inbound and outbound communications are made. Thus, in the case of an IVR bot, the applicable channels may include an inbound voice channel and outbound voice channel, each of which may be conducted over a voice connection with a customer, such as by mobile telephone or VoIP line.

In accordance with exemplary embodiments, the evaluation of intelligence or RIQ for a given bot over a given channel may include a rating or scoring system that includes a predefined range of scoring alternatives. As an example, the scoring system may include a predetermined numerical range that includes numbers associated with a low range of scores, which correspond with low RIQ, numbers associated with a high range scores, which correspond with high RIQ, and, therebetween, numbers associated with a middle range of scores, which correspond with medium RIQ. In example embodiments, the range of RIQ scores may be calibrated in accordance with comparisons to target bot capabilities, which, as discussed more below, are target levels of proficiency at required tasks. In example embodiments, the range of RIQ scores may be calibrated in accordance with comparisons to target bot capabilities, which, as discussed more below, are target levels of proficiency at required tasks. In other embodiments, the range of RIQ scores may be calibrated in accordance with levels of human proficiency at such tasks.

More particularly, embodiments of the present invention may include an RIQ scoring system that is a numerical range of between 1.0 and 15.0. Further, the RIQ scoring system may define scores within the numerical range in relation to comparisons to human intelligence. Such comparisons may be made in reference to a human subject or counterpart, which may be considered as a person of average ability. Thus, for example, within the example scoring range of 1.0 to 15.0, the RIQ scoring system may be configured such that a certain RIQ score is indicative of an intelligence level of the human counterpart, i.e., a human of average ability. To take the example further, a score of 10.0 in the range of 1.0 to 15.0 may be deemed as a score that indicate a bot RIQ is indistinguishable from (or, at least, similar to) the intelligence of the human counterpart. Going further still, the top score in the range of RIQ scoring system—i.e., a 15.0—represents a score in which the bot demonstrates performance that is well beyond human capabilities, for example, to the extent that the performance of the bot appears almost magic-like in terms of achieved results and/or customer experience compared to human results. The other possible scores occurring between the human equivalent score of 10.0 and the top score of 15.0 may be used to indicate increasing levels of performance where each is better than that of the average human. Finally, scores between the low scored of 1.0 and the human equivalent score of 10.0 may be used to indicated increasing levels of performance where each is worse than that of the average human.

As discussed more below, such equivalence and comparisons of cognitive abilities may be based on data collected measuring the performance capabilities for both the bot and humans while performing certain predetermined tasks. In order to intelligently makes such comparisons between bot and human capabilities so that the results can then be extrapolated into cognitive, the performance data must be accurately collected and variable controlled. That is, the data must be collected in ways that ensure the bot and humans test subjects were performing in contexts that are the same. First, of course, the activity or task being used to evaluate performance must be the same for both the bot and humans. Second, the channel over which the task is performed has to be the same for both the bot and humans. And, third, the task for both the bot and humans has to involve the same context, business objective or engagement scenario, as described in more detail below.

The RIQ rating system may be used to rate the intelligence of a particular bot over a single channel or, in cases where the particular bot operates over multiple channels, the RIQ rating system may be used to provide an overall intelligence. Used in relation to a single communication channel, the type of intelligence may be referenced as "channel RIQ" and the corresponding RIQ score may be referenced as a "channel RIQ score". When the intelligence of a bot is rated or scored across multiple communication channels, the type of intelligence may be referenced as "overall RIQ" and the corresponding RIQ score may be referenced as a "overall RIQ score".

The idea of overall RIQ will now be explored further with reference to bots that are capable of performing across multiple channels. When a bot is able to do this—particularly when able to maintain a high level of performance across channels—the bot is referred to herein as a multichannel or omnichannel bot. Such omnichannel bots, for example, may adapt output and input capabilities in accordance with features specific to the channel that is currently in use. For instance, an omnichannel bot may manage voice-based and text-based communications depending on the current channel. In this way, omnichannel bots may be able to provide a consistent customer experience across multiple communication channels. This type of flexibility further may include providing consistent customer service while communicating over voice or text, including having channel dependent content that is applicable to one channel type but not the other. For example, an omnichannel bot may be capable of delivering content that is specific to a particular channel so that the characteristics of that channel are utilized in the best way. Accordingly, in this way, omnichannel bots are able to maximize performance across multiple communication channels.

Figure 9:
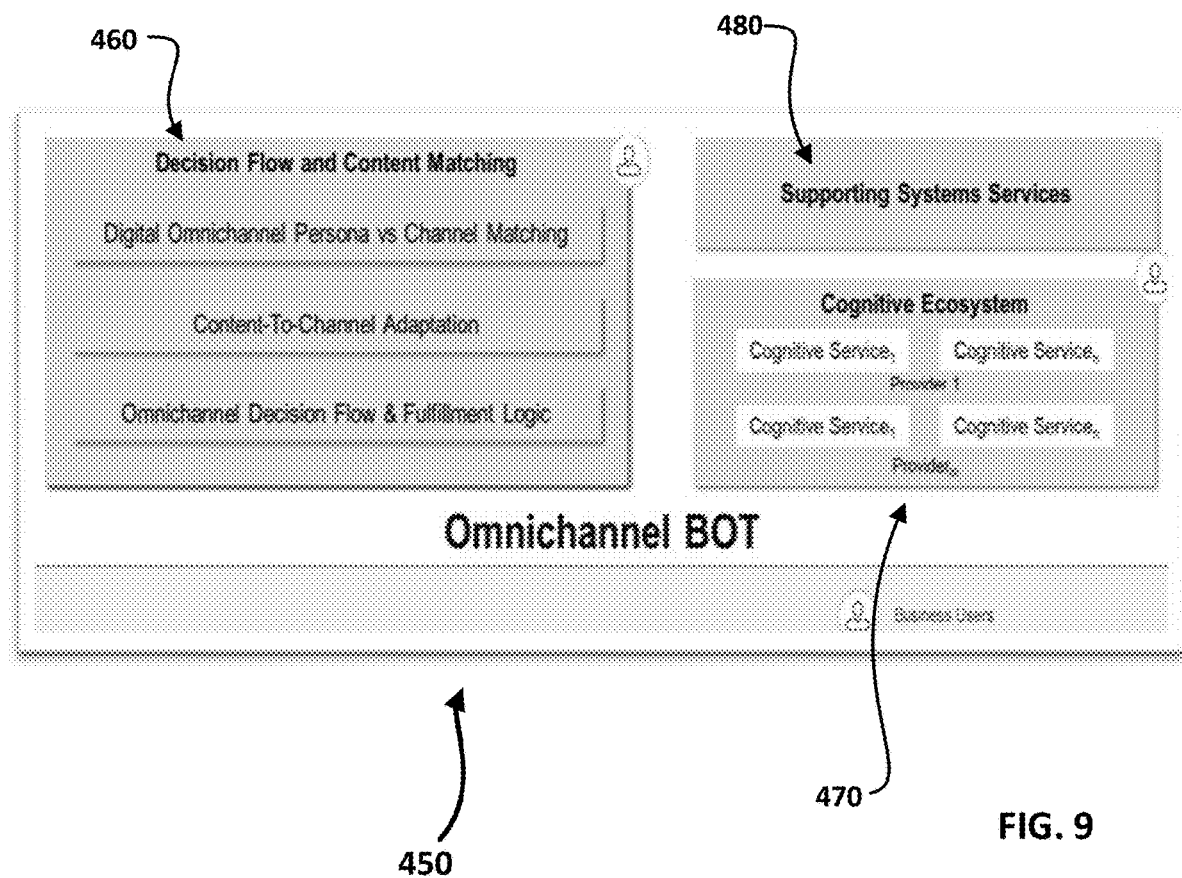
FIG. 9 is a schematic representation of an omnichannel bot according to embodiments of the present invention.

Thus, with reference to FIG. 9, a multichannel or omnichannel bot 500 is able to function on multiple channels with the same underlying infrastructure. To enable such flexible usage, as depicted in the schematic system representation of FIG. 9, an exemplary omnichannel bot 500 may be configured to have the following characteristics or functionality.

First, in exemplary embodiments, the omnichannel bot 500 may be structured to provide tools related to matching persona, content, and decision flow to channel. Such tool may be referred to generally as channel matching tools 460. As indicated, the channel matching tools 460 may provide channel dependent personas (or "omnichannel personas") designed to match a persona being used by the omnichannel bot to the current channel being used. More specifically, the set of behaviors for an omnichannel bot that are specific to a given channel (or "channel specific") can be thought of as unique persona of the omnichannel bot. The channel matching tools 460 may further provided and match content to particular channels. Such content-to-channel matching allows the multichannel bot to enhance overall functionality by fluidly switching between content in accordance with the current channel, thereby enabling the use of content that is particularly well-suited for use on a given channel. In addition, decision flow and fulfillment logic may be matched to the present channel.

Second, in exemplary embodiments, the omnichannel bot 450 may be configured to integrate with one or more cognitive ecosystems 470. For example, these may include different cognitive services, such as, natural language processing, image recognition, sentiment analysis, intent classification, and the like, which then may be applied across several channels. Such cognitive services also may be classified by enterprise or provider. In this way, the omnichannel bot 450 may be used across functions or cognitive services as well as in relation to different business or other different organizations.

Third, in exemplary embodiments, omnichannel bots may be designed to integrate with supporting systems services 480. Such supporting system services, for example, are those that enable the omnichannel bot to execute fulfillment logic as per interaction outcomes.

In relation to omnichannel bots, systems and methods of the present invention may be provided for evaluating bot intelligence or RIQ. These systems and methods may be similar to the scoring process introduced above for evaluating the RIQ of a bot in relation to a single channel but may be applied to each of the channels that a given omnichannel bot services. In relation to omnichannel bots, thus, the RIQ evaluation process may be repeated to so that the bot is evaluate across each of the applicable channels. More particularly, an RIQ score for the omnichannel bot may be determined for each of the channels applicable to the omnichannel bot. Then those scores may be aggregated in some way, such as totaled or averaged, in order to derive an overall intelligence for the omnichannel bot. As stated above, this approach provides a way to evaluate the overall robotic intelligence quotient (or "overall RIQ") of the omnichannel bot. As used herein, the overall RIQ represents a measure of an omnichannel bot' s ability or intelligence that takes into account the performance over multiple channels.

As an example, because of certain limitations in less sophisticated bots—such as the rules-based IVR bot introduced above—achieving a high overall RIQ score is likely not possible. However, within the narrow context for which it was designed, the IVR bot may still provide effective performance. Though that effective performance may be restricted to certain well-defined functions and within a voice-based channel, when so limited, the IVR bot may still achieve a high channel RIQ score. Further, in regard to channel RIQ, the IVR bot may out score a much more sophisticated AI-powered omnichannel bot. Because the IVR bot lacks the ability to perform across other channels, though, the overall IQ of the IVR bot will likely be much lower than that of the AI-powered omnichannel bot.

In this way, the RIQ of bots can be evaluated in relation to cognitive performance and capabilities over a single channel and multiple channels. Once calculated, the RIQ scores may be used to compare bots, with the results providing insights that can be used to deploy bot resources more effectively within a contact center, particularly those supporting a multichannel environment. In relation to omnichannel bots, for example, two different intelligence measures may be obtained: (1) a "channel RIQ", which applies to a bot intelligence evaluated in relation to capabilities over a specific channel; and (2) an "overall RIQ", which applies to bot intelligence evaluated in relation to capabilities over a plurality of different channels. Put another way, the channel RIQ evaluates the type of work a bot is capable to doing over a single channel, while the overall RIQ considers the type of work that a bot is capable of doing over multiple channels. As persons can perform better in certain areas, bots also exhibit strengths and weaknesses that manifest different over different channels. Using the omnichannel rating system described herein, evaluations of bot intelligence and other capabilities may be made so to express channel-specific differences. As will be seen, once such differences are known and quantified, bot resources may be better allocated—such as in the manner in which incoming customer communications are routed—so to improve customer experience and contact center performance. For example, incoming interactions may be routed in ways that increase the use of channels in which a given bot exhibits strong capabilities while avoiding those channels of weaker ones. Additionally, as discussed more below, the RIQ scoring for a given bot may be used to optimize ways in which that bot may be improved, particularly in regard to the bot's use in relation to a particular channel.

In accordance with certain attributes of the present RIQ rating system, the RIQ scores calculated for a given bot may be context dependent. As used herein, such context may be referred to generally as an "engagement scenario" and represent both contextual objectives, such as commercial goals, and the tasks required to satisfy those objectives. For example, an engagement scenario may define the overall objective of the role that the bot is fulfilling, such as whether that role is information gathering, customer service, outbound sales, agent assistance, etc. Further, an engagement scenario may define the tasks associated with that role, i.e., the functionality that will be provided by a bot toward achieving an intended goal or objective. As will be appreciated, within contact centers, a bot may be configured to perform within several different engagement scenarios, including, for example, gathering data during an initial stage of a chat, connecting parties within an interaction, answering customer service questions, assisting agents during current interactions, or communicating with potential customers in outbound sales campaigns. The RIQ for a given bot may vary depending on the engagement scenario. For example, a certain bot may have an RIQ score of 8.0 for intelligence and other capabilities related to an engagement scenario involving customer services-oriented tasks, while the same bot has only an RIQ of 5.0 in relation to an engagement scenario involving sales-oriented tasks. As will be appreciated, this type of differential can be caused by how well the features, capabilities, and behavior of the bot—as ultimately reflected in the RIQ score—are developed for different types of tasks required by particular engagement scenario. In this way, a given bot may have different RIQ scores depending on the type of tasks need for a particular engagement scenario.

In accordance with example embodiments, systems and methods are provided to evaluate the channel RIQ and overall RIQ of bots. The method will now be described in relation to an example method and a particular bot. For ease of reference within the example the bot will be referred to as a "first bot". Also, for the example, the first bot is a multichannel or omnichannel bot that can perform functions across a plurality of communication channels, which will be referred to as a "first channel" and a "second channel". With these reference stipulations, the present invention may include a method that includes the following steps.

In exemplary embodiments, a first step of the method may include identifying a bot (hereinafter referred to as a "first bot") that is configured to perform one or more engagement scenarios over at least a plurality of channels within a contact center.

In exemplary embodiments, a second step may include identifying a first engagement scenario from the one or more engagement scenarios. The first engagement scenario, for example, may define a functional role and related tasks capable of being performed by the first bot in relation to satisfying one or more business objectives or other goals.

In exemplary embodiments, a third step of the method may include identifying target bot capabilities. As used herein, the term "target bot capabilities" refers to a target or desired proficiency level related to cognitive functionality required to perform the tasks of the first engagement scenario. The target bot capabilities, thus, may define proficiency levels in relation to performing one or more cognitive behaviors, actions, or other functions in the performance of the tasks of the first engagement scenario. As previously defined, the term "engagement scenario" defines both contextual objectives, such as commercial goals, and the tasks required to satisfy those objectives. Target bot capabilities also may be channel dependent, i.e., different across the first and second channels. Thus, for the first engagement scenario, the target bot capabilities may need to be separately identified in relation to each channel. In the present example, the target bot capabilities for the first bot are identified for each of the first channel and the second channel in relation to the first engagement scenario. The target bot capabilities may differ some for each of the channels being evaluated because certain tasks are unique to a particular channel.

In exemplary embodiments, a fourth step of the method may include identifying target human capabilities. As used herein, the term "target human capabilities" refers to a desired proficiency level related to humans (such as the human agents of a contact center) performing tasks related to the first engagement scenario. Similar to how target bot capabilities are identified, the target human capabilities may define a proficiency level in relation to performing one or more behaviors, actions, or other functions related to the tasks of the first engagement scenario. Further, target human capabilities are identified for the first and second channels.

In exemplary embodiments, a fifth step of the method may include identifying and collecting data describing performance attributes of the first bot and one or more humans performing the tasks of the engagement scenario. The data may be collected in relation to performing the tasks over both the first and second channels. As part of this step, it may first be necessary to define the criteria that will be used to evaluate performance and determine if the necessary data for the criteria will be available. As will be appreciated, such criteria may be both objective and subjective. In example embodiments, the criteria may be defined in relation to several types of data commonly maintained by contact centers, including, but not limited to, customer surveys, agent surveys, and other key performance and operational indicators describing contact center operations. As another example, criteria may be defined in relation to common interaction analytics, including, but not limited to, resolution rates, such as first contact resolution, interaction duration, required handoffs to other contact center resources, and success rates in defined business objections, like sales transacted, upselling rates, prospective buyer handoffs to sales agents, etc. With the criteria and related data defined, from there, the data may be collected in relation to the tasks being performed multiple times by the first bot and the human subjects. The number of samples may be selected in accordance achieving a sample size that is statistically meaningful.

In exemplary embodiments, a sixth step of the method includes aggregating and correlating the collected data via the use of statistical algorithms in order to gain useful insights therefrom. For example, an RIQ score for the first bot may be calculated in relation the first channel based on how the first bot performed on the first channel in relation to the proficiency levels described by the target bot capabilities identified for the first channel. Similarly, an RIQ score for the first bot may be calculated in relation the second channel based on how the first bot performed on the second channel in relation to the proficiency levels described by the target bot capabilities identified for the second channel. With those channel RIQ scores calculated, an overall RIQ score may be calculated for the first bot that reflects proficiency across multiple channels (in this case, the first and second channels). As another example, the data of the performance of the human subjects may be used to calculate RIQ scores, both channel and overall, in relation to the levels of proficiency achieved by the human subjects. This may include establishing a bench line for average human proficiency. As described above, bot RIQ may be expressed as being worse than humans, equivalent to humans, and/or better than humans. The calculated channel RIQ scores and overall RIQ scores for the first bot may be reported, where such RIQ scores are calculated via comparisons to target bot capabilities or human performance.

In exemplary embodiments, a next step includes individuating specific gaps based on the reported channel RIQ score and overall RIQ score. Once determined, such gaps can be used to orient and prioritize training and development for the first bot. An advantage associated with the present invention is that results may be used to optimize further development of the first bot so that the most pressing needs are addressed. Further, while the above-described method may be applied to develop the first bot toward improving within the given engagement scenario used during the scoring process, it may also be applied to other engagement scenarios that include similar tasks. In such cases, significant similarities and differences between the two engagement scenarios—i.e., the engagement scenario used to derive the RIQ scores and the new or prospective engagement scenario—may be gleamed by examining where the tasks overlap. The similarities and differences may be used to direct training and development for using the first bot in the prospective engagement scenario.

To more accurately express an overall RIQ score for a bot in relation to a specific engagement scenario, several factors may be considered, each of which will now be introduced and discussed. A first of these factors to consider (e.g., as part of the methodology described above) relates to applicable touch points. Personal assistant bots are typically limited to specific devices and, thus, limited to certain touch points. Another factor to consider is the applicable channels. This factor includes the types of channels that will be used, for example, are the channels voice-based and/or text-based. Another factor relates to input and output capabilities. Input capabilities includes whether there is flexibility in the way user inputs are captured. In regard to the IVR bot, for example, inputs were very limited. In other cases, bots may be more versatile, accepting inputs via ASR and/or NLP language processing. In regard to output capabilities, these refer to the ability to respond on the same channel. Output capabilities also refer to versatility, i.e., the ability to respond on a variety of different channels, such as, in response to user preference. Another factor is processing ability, which, as used herein, refers to the number of different customer intents a bot recognizes. Another factor for consideration is personalization. As used in this context, personalization refers to an ability to personalize services for a given customer based on that customer's profile, history, and/or preferences. Another factor for consideration is actionability. As used herein, actionability refers to the ability to fulfill the intent of the customer once recognized. Another factor for consideration is resilience. As used herein, resilience references a bot's ability to take a variety of approaches to solve issues and handle customer interactions successfully. Another factor for consideration is continuous improvement. As used herein, the continuous improvement factor refers to the availability of available tools to train the bot and enhance its decision making and actionability. A final factor for consideration is referenced herein as cooperation. As used herein, the cooperation factor refers to the extent to which the bot will need to cooperate with other bots or human. The cooperation factor also may include considerations in regard to the nature or type of cooperation required, for example, will the cooperation happen on the front end of an interaction (e.g., making a connection or gather basic information from a customer before the customer speaks to a human agent), during an interaction (e.g., assisting a human agent during an ongoing interaction), or after an interaction is complete (e.g., to handle follow-up reminders and actions for a human agent).

Figure 10:
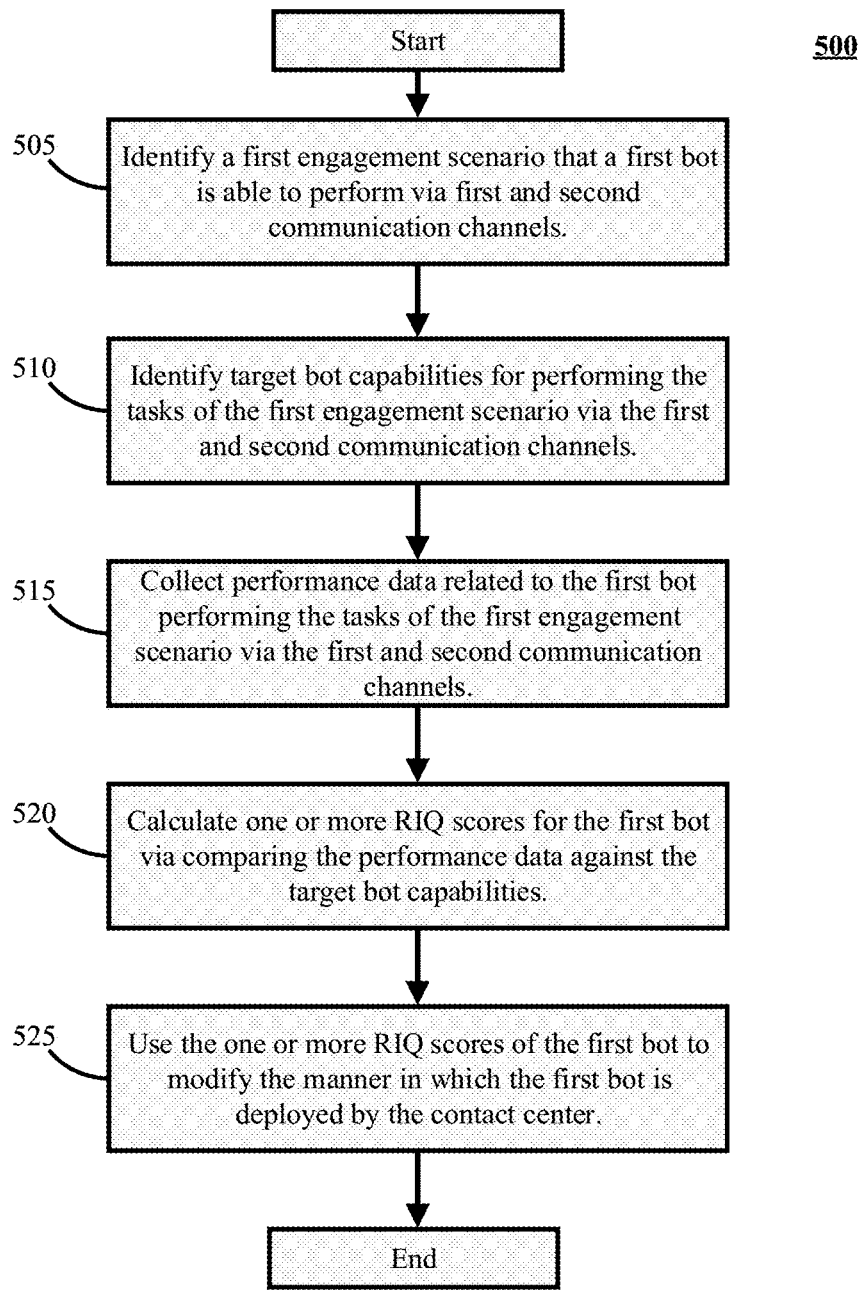
FIG. 10 is a method according to embodiments of the present invention.

With reference now to FIG. 10, a method 500 is shown related to an exemplary embodiment for managing automated resources within a contact center. The automated resources may include a plurality of bots configured to perform a plurality of engagement scenarios via a plurality of communication channels. As will be seen, the method 500 may include calculating one or more robotic intelligence quotient (hereinafter "RIQ") scores for a first bot of the plurality of bots being used by the contact center. Each of the one or more RIQ scores may be a measure of bot cognitive capabilities and, further, may include channel RIQ scores or overall RIQ scores. The method may further include using the calculated RIQ scores of the first bot to modify a manner in which the first bot is being managed or deployed by the contact center to handle interactions with customers.

As depicted, at an initial operation 505, the method 500 begins with identifying a first engagement scenario of the plurality of engagement scenarios that the first bot is able to perform via first and second communication channels. As defined above, the first engagement scenario may define a functional role and tasks related thereto for satisfying one or more predetermined objectives. As shown, the method 500 then continues with control being passed to operation 510.

At operation 510, the method 500 may include identifying: target bot capabilities for performing the tasks of the first engagement scenario via the first communication channel; and target bot capabilities for performing the tasks of the first engagement scenario via the second communication channel. In alternative embodiments, as discussed above, this step may also include or be replaced with identifying human performance standards for equivalent performance. As illustrated, the method 500 then continues with control being passed to operation 515.

At operation 515, the method 500 may include collecting: performance data related to the first bot performing the tasks of the first engagement scenario via the first communication channel; and performance data related to the first bot performing the tasks of the first engagement scenario via the second communication channel. In alternative embodiments, this step may also include or be replaced by collecting performance data related to equivalent human performance, which then may be used to derive human performance standards for comparing to the performance of the first bot. As illustrated, the method 500 then continues with control being passed to operation 520.

At operation 520, the method 500 may include calculating one or more RIQ scores for the first bot via by comparing the performance data against the target bot capabilities. This may include calculating a channel RIQ score related to the first communication channel (hereinafter "first channel RIQ score") and the second communication channel (hereinafter "second channel RIQ score"). Such channel RIQ scores may be calculated by comparing performance to target capabilities. Thus, the first channel RIQ score may be calculated by comparing: the target bot capabilities for performing the tasks of the first engagement scenario via the first communication channel; and the performance data related to the first bot performing the tasks of the first engagement scenario via the first communication channel. The second channel RIQ score may be calculated by comparing: the performance data related to the first bot performing the tasks of the first engagement scenario via the second communication channel; and the target bot capabilities for performing the tasks of the first engagement scenario via the second communication channel. Further, an overall RIQ score may be calculated by mathematically combining the first channel RIQ score and the second channel RIQ, such as by summing, averaging, etc.

At operation 520, the method 500 may include using the one or more RIQ scores that were calculated in the previous step to modify a manner in which the first bot is deployed by the contact center to handle interactions with customers. For example, comparisons may be made between the first channel RIQ score to the second channel RIQ score. From such comparisons, a routing process may be modified by increasing or decreasing a likelihood that incoming interactions on the first communication channel are routed to the first bot instead of incoming interactions on the second communication channel. The same comparison may be used to generate a development plan related to the first bot that prioritizes development in relation to one of the first or second communication channels based on which of the first channel or second channel RIQ scores the comparison shows to be better. In such cases, a communication to a user within the contact center may be sent recommending the development plan.

As another example, the RIQ scores of the first bot may be compared to equivalent RIQ scores of a second bot. Such comparisons may be made in relation to channel RIQ scores or overall RIQ scores. For example, the overall RIQ score of the first bot may be compared to the overall RIQ score of the second bot. From the comparison, a development plan may be generated that prioritizes one of the first or second bots based on which of the first or second bots had the better of the overall RIQ scores. A communication may then be issued recommending the development plan. In another example, the comparison of the overall RIQ scores may be used to modify a routing process by increasing or decreasing a likelihood that incoming interactions are routed to the first bot instead of the second bot. As well be appreciated, routing processes may be modified in accordance with channel RIQ comparisons so to more closely match channel-dependent cognitive abilities of different bots in ways that improve customer experience.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A system for managing automated resources within a contact center, the automated resources comprising a plurality of bots, the bots configured to perform a plurality of engagement scenarios via a plurality of communication channels, the system comprising:
    a hardware processor; and
    a machine-readable storage medium on which is stored instructions that cause the hardware processor to execute the steps of:
        calculating a channel robotic intelligence quotient (hereinafter "channel RIQ") score for a first bot of the plurality of bots in relation to a first communication channel of the plurality of communication channels; and
        using the channel RIQ score of the first bot to modify a manner in which the first bot is deployed by the contact center to handle interactions with customers;
        wherein the step of calculating the channel RIQ score for the first bot comprises a first process that includes the steps of:
            identifying a first engagement scenario of the plurality of engagement scenarios that the first bot is able to perform via the first communication channel, wherein the first engagement scenario comprises a functional role and tasks related thereto for satisfying one or more predetermined objectives;
            identifying target bot capabilities for performing the tasks of the first engagement scenario via the first communication channel;
            collecting performance data related to the first bot performing the tasks of the first engagement scenario via the first communication channel;
            calculating the channel RIQ score for the first bot by comparing:
                the performance data related to the first bot performing the tasks of the first engagement scenario via the first communication channel; and
                the target bot capabilities for performing the tasks of the first engagement scenario via the first communication channel.

2. The system of claim 1, wherein the first process further comprises the step of:
    identifying a performance standard related to humans performing the tasks of the first engagement scenario via the first communication channel;
    wherein the step of calculating the channel RIQ score for the first bot comprises basing, at least in part, the channel RIQ score on a comparison between:
        the performance data related to the first bot performing the tasks of the first engagement scenario via the first communication channel; and
        the performance standard relating to the human performing the tasks of the first engagement scenario via the first communication channel.

3. The system of claim 2, wherein the performance standard related to the humans comprises a range that is configured about a middle value embedded within the range that represents performance equivalent to a human of average ability such that:

a first subrange defined to a first side of the middle value that represents performance below that of the human of average ability; and a second subrange defined to a second side of the middle value that represents performance above that of the human of average ability.

4. The system of claim 1, wherein the step of using the channel RIQ score to modify the manner in which the first bot is deployed comprises:

using the channel RIQ score to determine that the first bot is less proficient in a first functional area related to a first one of the tasks than a second functional area related to a second one of the tasks;

based on the determined relative proficiencies of the first bot in the first and second functional areas, generating a development plan for the first bot in which the first functional area is prioritized for additional development over the second functional area; and issuing a communication to a user within the contact center recommending that the development plan.

5. The system of claim 1, wherein the plurality of bots comprises a second bot, and wherein the second bot comprises a channel RIQ score for the first communication channel;

wherein step of using the channel RIQ score of the first bot to modify the manner in which the first bot is deployed comprises:

comparing the channel RIQ score of the first bot to the channel RIQ score of the second bot;

given the comparison of the channel RIQ scores, generating a development plan related to the first communication channel that prioritizes one of the first or second bots based on which of the first or second bots had the better of the channel RIQ score;

issuing a communication to a user within the contact center recommending the development plan.

6. The system of claim 1, wherein the plurality of bots comprises a second bot, and wherein the second bot comprises a channel RIQ score for the first communication channel;

wherein step of using the channel RIQ score of the first bot to modify the manner in which the first bot is deployed comprises:

comparing the channel RIQ score of the first bot to the channel RIQ score of the second bot; and based on the comparison of the channel RIQ scores, modifying a routing process by increasing or decreasing a likelihood that incoming interactions on the first communication channel are routed to the first bot instead of the second bot.

7. The system of claim 1, wherein the target bot capabilities comprise desired proficiency levels related to cognitive functionality for performing the tasks of the first engagement scenario via the first communication channel; and wherein the channel RIQ score is defined as a measure of bot cognitive capabilities in relation to performing the tasks of the first engagement scenario via the first communication channel.

8. A computer-implemented method of managing automated resources within a contact center, the automated resources comprising a plurality of bots, the bots being configured to perform a plurality of engagement scenarios via a plurality of communication channels, the method comprising:

calculating one or more robotic intelligence quotient (hereinafter "RIQ") scores for a first bot of the plurality of bots, each of the one or more RIQ scores comprising a measure of bot cognitive capabilities; and using the one or more RIQ scores of the first bot to modify a manner in which the first bot is deployed by the contact center to handle interactions with customers;

wherein calculating the one or more RIQ scores for the first bot comprises:

identifying a first engagement scenario of the plurality of engagement scenarios that the first bot is able to perform via first and second communication channels of the plurality of communication channels, wherein the first engagement scenario comprises a functional role and tasks related thereto for satisfying one or more predetermined objectives;

identifying:

target bot capabilities for performing the tasks of the first engagement scenario via the first communication channel; and target bot capabilities for performing the tasks of the first engagement scenario via the second communication channel;

collecting:

performance data related to the first bot performing the tasks of the first engagement scenario via the first communication channel; and performance data related to the first bot performing the tasks of the first engagement scenario via the second communication channel;

calculating a first one of the one or more RIQ scores as a channel RIQ score related to the first communication channel (hereinafter "first channel RIQ score") by comparing:

the target bot capabilities for performing the tasks of the first engagement scenario via the first communication channel; and the performance data related to the first bot performing the tasks of the first engagement scenario via the first communication channel;

calculating a second one of the one or more RIQ scores as a channel RIQ score related to the second communication channel (hereinafter "second channel RIQ score") by comparing:

the target bot capabilities for performing the tasks of the first engagement scenario via the second communication channel and the performance data related to the first bot performing the tasks of the first engagement scenario via the second communication channel.

9. The method of claim 8, wherein step of using the one or more RIQ scores of the first bot to modify the manner in which the first bot is deployed comprises:

comparing the first channel RIQ score to the second channel RIQ score; and based on the comparison of the first and second channel RIQ scores, modifying a routing process by increasing or decreasing a likelihood that incoming interactions on the first communication channel are routed to the first bot instead of incoming interactions on the second communication channel.

10. The method of claim 8, wherein step of using the one or more RIQ scores of the first bot to modify the manner in which the first bot is deployed comprises:

comparing the first channel RIQ score to the second channel RIQ score;

generating a development plan related to the first bot that prioritizes development in relation to one of the first or second communication channels based on which of the first channel or second channel RIQ scores the comparison shows to be better; and issuing a communication to a user within the contact center recommending the development plan.

11. The method of claim 8, wherein calculating the one or more RIQ scores for the first bot comprises:

calculating a third one of the one or more RIQ scores as an overall RIQ score by mathematically combining the first channel RIQ score and the second channel RIQ.

12. The method of claim 11, wherein the plurality of bots comprises a second bot, and wherein the second bot comprises an overall RIQ score for the first and second communication channels;

wherein step of using the one or more RIQ scores of the first bot to modify the manner in which the first bot is deployed comprises:

comparing the overall RIQ score of the first bot to the overall RIQ score of the second bot;

given the comparison of the overall RIQ scores, generating a development plan that prioritizes one of the first or second bots based on which of the first or second bots had the better of the overall RIQ scores;

issuing a communication to a user within the contact center recommending the development plan.

13. The method of claim 11, wherein the plurality of bots comprises a second bot, and wherein the second bot comprises an overall RIQ score for the first and second communication channels;

wherein step of using the one or more RIQ scores of the first bot to modify the manner in which the first bot is deployed comprises:

comparing the overall RIQ score of the first bot to the overall RIQ score of the second bot; and based on the comparison of the overall RIQ scores, modifying a routing process by increasing or decreasing a likelihood that incoming interactions on the first and second communication channels are routed to the first bot instead of the second bot.

14. The method of claim 11, wherein the target bot capabilities comprise desired proficiency levels related to cognitive functionality for performing the tasks of the first engagement scenario for a given one of the plurality of communication channels.

15. A computer-implemented method of managing automated resources within a contact center, the automated resources comprising a plurality of bots, the bots being configured to perform a plurality of engagement scenarios via a plurality of communication channels, the method comprising:

calculating one or more robotic intelligence quotient (hereinafter "RIQ") scores for a first bot of the plurality of bots, each of the one or more RIQ scores comprising a measure of bot cognitive capabilities; and using the one or more RIQ scores of the first bot to modify a manner in which the first bot is deployed by the contact center to handle interactions with customers;

wherein calculating the one or more RIQ scores for the first bot comprises:

identifying a first engagement scenario of the plurality of engagement scenarios that the first bot is able to perform via first and second communication channels of the plurality of communication channels, wherein the first engagement scenario comprises a functional role and tasks related thereto for satisfying one or more predetermined objectives;

collecting:

performance data related to the first bot performing the tasks of the first engagement scenario via the first communication channel; and performance data related to the first bot performing the tasks of the first engagement scenario via the second communication channel;

collecting:

performance data related to humans performing the tasks of the first engagement scenario via the first communication channel; and performance data related to humans performing the tasks of the first engagement scenario via the second communication channel;

calculating a first one of the one or more RIQ scores as a channel RIQ score related to the first communication channel (hereinafter "first channel RIQ score") by comparing:

the performance data related to the first bot performing the tasks of the first engagement scenario via the first communication channel; and the performance data related to the humans performing the tasks of the first engagement scenario via the first communication channel;

calculating a second one of the one or more RIQ scores as a channel RIQ score related to the second communication channel (hereinafter "second channel RIQ score") by comparing:

the performance data related to the first bot performing the tasks of the first engagement scenario via the second communication channel; and the standard relating to human performance of the tasks of the first engagement scenario via the second communication channel.

16. The method of claim 15, wherein step of using the one or more RIQ scores of the first bot to modify the manner in which the first bot is deployed comprises:

comparing the first channel RIQ score to the second channel RIQ score; and based on the comparison of the first and second channel RIQ scores, modifying a routing process by increasing or decreasing a likelihood that incoming interactions on the first communication channel are routed to the first bot instead of incoming interactions on the second communication channel.

17. The method of claim 15, wherein step of using the one or more RIQ scores of the first bot to modify the manner in which the first bot is deployed comprises:

comparing the first channel RIQ score to the second channel RIQ score;

generating a development plan related to the first bot that prioritizes development in relation to one of the first or second communication channels based on which of the first channel or second channel RIQ scores the comparison shows to be better; and issuing a communication to a user within the contact center recommending the development plan.

18. The method of claim 15, wherein calculating the one or more RIQ scores for the first bot comprises:

calculating a third one of the one or more RIQ scores as an overall RIQ score by mathematically combining the first channel RIQ score and the second channel RIQ.

19. The method of claim 18, wherein the plurality of bots comprises a second bot, and wherein the second bot comprises an overall RIQ score for the first and second communication channels;

wherein step of using the one or more RIQ scores of the first bot to modify the manner in which the first bot is deployed comprises:
  comparing the overall RIQ score of the first bot to the overall RIQ score of the second bot; and
  based on the comparison of the overall RIQ scores, modifying a routing process by increasing or decreasing a likelihood that incoming interactions on the first and second communication channels are routed to the first bot instead of the second bot.

20. The method of claim 18, wherein the plurality of bots comprises a second bot, and wherein the second bot comprises an overall RIQ score for the first and second communication channels;
  wherein step of using the one or more RIQ scores of the first bot to modify the manner in which the first bot is deployed comprises:
    comparing the overall RIQ score of the first bot to the overall RIQ score of the second bot;
    given the comparison of the overall RIQ scores, generating a development plan that prioritizes one of the first or second bots based on which of the first or second bots had the better of the overall RIQ scores;
    issuing a communication to a user within the contact center recommending the development plan.

* * * * *